United States Patent
Nguyen

(10) Patent No.: US 10,585,924 B2
(45) Date of Patent: Mar. 10, 2020

(54) PROCESSING NATURAL-LANGUAGE DOCUMENTS AND QUERIES

(71) Applicant: Cuong Duc Nguyen, Sacramento, CA (US)

(72) Inventor: Cuong Duc Nguyen, Sacramento, CA (US)

(*) Notice: Subject to any disclaimer, the term of this patent is extended or adjusted under 35 U.S.C. 154(b) by 487 days.

(21) Appl. No.: 14/455,447

(22) Filed: Aug. 8, 2014

(65) Prior Publication Data
US 2016/0042058 A1 Feb. 11, 2016

(51) Int. Cl.
G06F 16/00 (2019.01)
G06F 16/33 (2019.01)
G06F 17/27 (2006.01)
G06F 16/332 (2019.01)

(52) U.S. Cl.
CPC ...... G06F 16/3344 (2019.01); G06F 16/3329 (2019.01); G06F 17/2705 (2013.01); G06F 17/2715 (2013.01); G06F 17/2785 (2013.01)

(58) Field of Classification Search
CPC ............ G06F 16/3329; G06F 17/2705; G06F 17/272; G06F 17/2785
USPC ........................................ 707/771, 778–779
See application file for complete search history.

(56) References Cited

U.S. PATENT DOCUMENTS

| 6,625,608 | B1* | 9/2003 | Watanabe | G06F 17/274 |
| 6,941,513 | B2* | 9/2005 | Meystel | G06F 17/2881 715/256 |
| 7,634,398 | B2* | 12/2009 | Knoll | G06F 17/271 704/1 |
| 9,152,623 | B2* | 10/2015 | Wroczy ski | G06F 17/2872 |
| 2004/0221235 | A1* | 11/2004 | Marchisio | G06F 17/271 715/261 |
| 2010/0228693 | A1* | 9/2010 | Dawson | G06F 17/2705 706/12 |
| 2013/0097174 | A1* | 4/2013 | Polanyi | G06F 17/30622 707/742 |
| 2014/0019385 | A1* | 1/2014 | Dawson | G06F 17/2705 706/10 |
| 2014/0136188 | A1* | 5/2014 | Wroczynski | G06F 17/2872 704/9 |
| 2014/0236986 | A1* | 8/2014 | Guzman | G06Q 10/107 707/769 |

* cited by examiner

*Primary Examiner* — Hanh B Thai
(74) *Attorney, Agent, or Firm* — Moazzam & Associates, LLC

(57) ABSTRACT

The subject disclosure presents a natural language processing engine for analyzing an input sentence comprising one or more clauses, and generating a plurality of semantic structures for the sentence and the component clauses, based on statistically parsing an input sentence to generate a syntactic structure of the input sentence, examining the syntactic structure of phrases and subordinate clauses within the input sentence, and generating tuples representing a subject, verb, object, indirect object, supplement, type, etc. Each part of the tuple is a reference to an entity in an external knowledge base. Disclosed operations include linking a plurality of entities identified in the syntactic structure with corresponding entities found in an external knowledge base, operating a co-reference resolution, filtering the references from mentioned entities to external entities by semantic relations, and exporting the set of output tuples.

18 Claims, 26 Drawing Sheets

Simple Sentence

Conditional Sentence

Sentence with a When-clause

Sentence with a leading phrase with an implicit subject

Simple Present

Simple Past

Future

Present Perfect

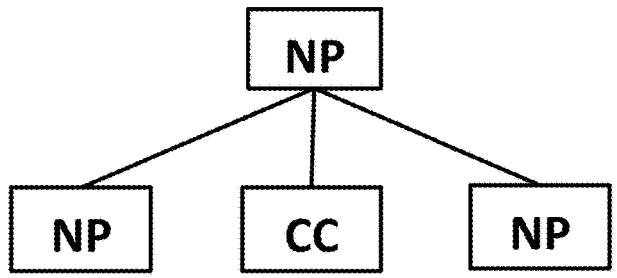
FIG. 14A
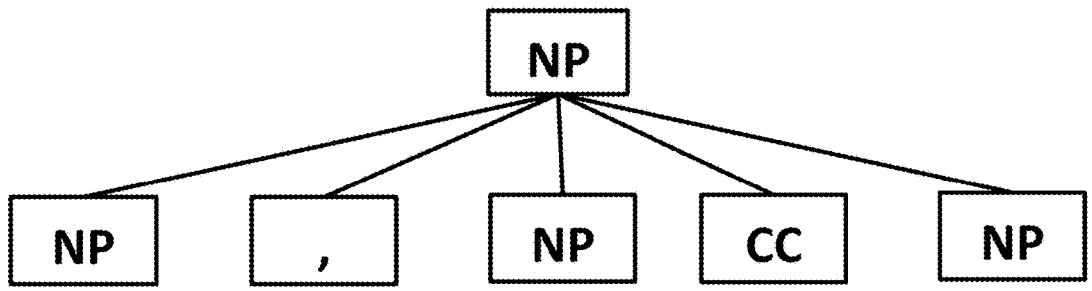
FIG. 14B
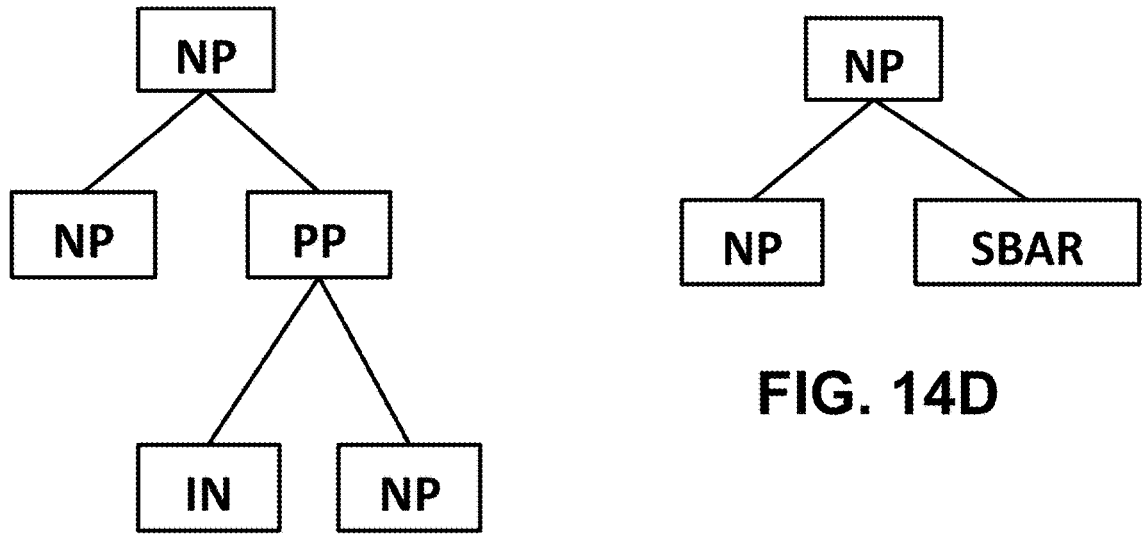
FIG. 14C
FIG. 14D

PROCESSING NATURAL-LANGUAGE DOCUMENTS AND QUERIES

BACKGROUND OF THE SUBJECT DISCLOSURE

Field of the Subject Disclosure

The subject disclosure relates to natural language processing. Specifically, the subject disclosure relates to systems and methods for processing documents and queries using natural language processing to construct tuples, wherein each part of a tuple is linked to an entity of a given knowledge base.

Background of the Subject Disclosure

Natural language has been used for thousands of years to store and transfer knowledge between human beings. Documents in natural languages are the most important and popular source for information retrieval systems and search engines. In such systems, natural-language queries may be a more user-friendly way to search for information than keyword-based queries employed in current search engines.

Several methods have been developed for extracting meaning from natural-language queries and documents. One of the most popular methods is Latent Semantic Indexing. A natural-language document is analyzed to extract main keywords. Each keyword is transformed to its rooted form and weighted by a statistical measure, e.g. term frequency/inverse document frequency (TF/IDF). A vector of these weighted keywords is used to represent the document in applications. In a search engine, for instance, documents with keywords matching the queried keywords can be returned as search results. In information retrieval systems, for instance, the similarity of documents is represented by the distance between their representative vectors. Despite wide usage of Latent Semantic Indexing, this method discards or fails to consider several meaningful features of the analyzed document.

In another approach, Natural Language Processing (NLP) has been used to extract more syntactic information from natural-language documents. Each sentence of a natural-language document is parsed and linguistically processed to extract Subject-Action-Object (SAO) triples or extended SAO (eSAO) tuples. Each part of an SAO triple or an eSAO tuple may be a text phrase. However this method fails to address the complexity of linguistics, such as nested clauses within a sentence.

SUMMARY OF THE SUBJECT DISCLOSURE

The subject disclosure addresses the above-identified concerns by presenting systems and methods for natural language processing engine (NLPE) that allow a user or client to input a natural-language query, such as a phrase, sentence, or plurality of sentences, and to receive relevant results. The NLPE may be executed to analyze an input sentence comprising one or more clauses, and to generate a plurality of semantic structures for the sentence and the component clauses. The NLPE may include a sentence parsing module for statistically parsing an input sentence to generate a syntactic structure of the input sentence. The NLPE may further include a phrase parsing module for examining the syntactic structure and creating a phrase-level syntactic structure. The phrase-level syntactic structure may be generated by recognizing one or more main and sentence-level subordinate clauses within an input sentence. A tuple generation module may be executed to generate one or more records or tuples, each of which stores a syntactic structure for each of a subject part, a verb part, and object parts of each clause, respectively. The NLPE may further comprise an entity-identification module for generating an entity-level syntactic structure based on noun and prepositional phrases in the corresponding part of the tuple. A reference module may be executed to correlate or link a plurality of entities identified in the entity-level syntactic structure with similar entities found in an external knowledge base. Finally, a linking module is executed to generate a sentence-level semantic structure based on a set of candidate entities that are determined by a co-reference resolution operation and links determined between the plurality of phrases. The sentence-level semantic structure may comprise a final set of tuples and may be used to generate results from search engines, information retrieval systems, or web semantic systems, etc.

BRIEF DESCRIPTION OF THE DRAWINGS

FIGS. 14A-D show a plurality of complex noun phrase templates, according to an exemplary embodiment of the subject disclosure.

DETAILED DESCRIPTION OF THE SUBJECT DISCLOSURE

Figure 1A:
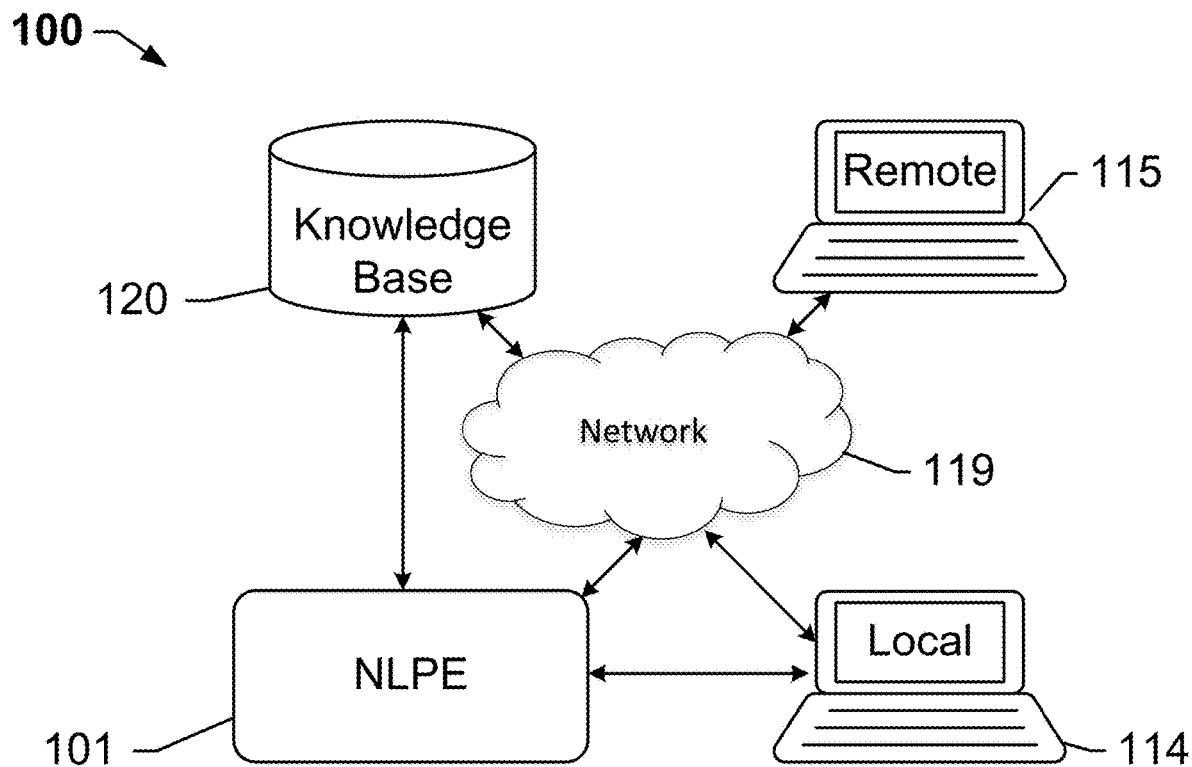
FIGS. 1A and 1B show a system for natural language processing, according to an exemplary embodiment of the subject disclosure.

The subject disclosure presents systems and methods for natural language processing (NLP) that allow a user or client to input a natural-language query, such as a phrase, sentence, or plurality of sentences, and to provide relevant results by employing an NLP engine (NLPE) to analyze the input query or sentence. The input sentence may be parsed to generate a plurality of syntactic structures at multiple levels, such as a sentence-level, a phrase-level, and an entity level. The phrase-level syntactic structure may be generated by recognizing one or more main and sentence-level subordinate clauses within an input sentence. For each clause, a phrase-level record may be generated to store the main parts of the clause. The phrase-level record may comprise a tuple of syntactic structures corresponding to various grammatical elements of the corresponding clause, such as subjects and objects, as well as a type of clause. For instance, the phrase-level record may be a tuple of (P1, P2, P3, P4, P5, P6), in which, P1, P2, P3, P4 and P5 may represent the syntactic structures of the subject part, the verb part, the direct object, the indirect object and the supplementary part of the clause, respectively, and P6 storing the type of the clause, such as "Main" or "Subordinate". A verb record may also be generated, comprising information about verb phrases within the clause such as the current surface form of extracted verb, stemmed form of the extracted verb, verb tense, positive or negative form, active or passive voice, etc. An entity-level syntactic structure may be based on noun and prepositional phrases in the corresponding part of the tuple. For instance, noun phrases and prepositional phrases in P1, P3, P4 and P5 of the phrase-level syntactic structure may be used to construct the entity-level syntactic structure. In each noun phrase, a plurality of entities may be recognized, and each entity is linked to a corresponding entity or set of corresponding entities in an external knowledge base. The entity-level syntactic structure may be considered an expansion of the phrase-level syntactic structure in that each P1, P3 and P4 of a phrase-level record may be attached with, linked to, or otherwise associated with a set of entities. Prepositional phrases in P5 of each clause may also be processed at this time to extract the supplement part of the clause. Finally, the entity-level syntactic structure may be analyzed to generate a sentence-level semantic structure that is based on a set of candidate entities that are determined by a co-reference resolution operation and links determined between the plurality of phrases. The filtered set of candidate entities and links may be combined to create a final set of tuples (T1, T2, T3, T4, T5, T6), in which, T1, T3 and T4 are entities in the external KB, T2 is a verb in the KB, T5 is the supplement information of the tuple, and T6 is the type (e.g., "main" or "support") of the tuple. The sentence-level semantic structure comprising the final set of tuples may be used to generate results from search engines, information retrieval systems, or web semantic systems, etc.

Figure 1B:
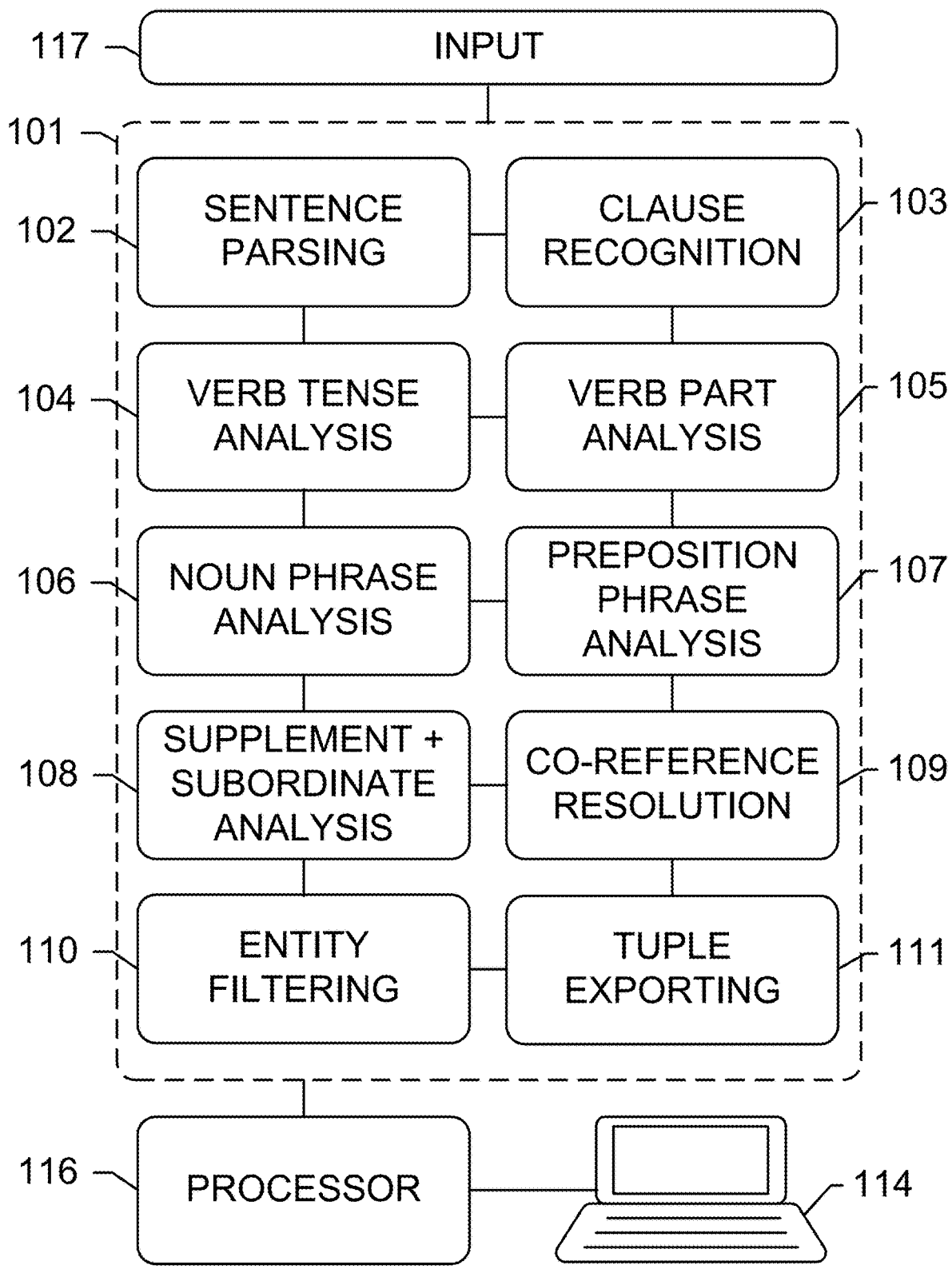

FIGS. 1A-1B show a system for natural language processing, according to an exemplary embodiment of the subject disclosure. FIG. 1A shows the components of a system infrastructure for enabling the operations disclosed herein, whether locally or remotely using a network. FIG. 1B shows the logical components of a natural language processing engine (NLPE), according to an exemplary embodiment of the subject disclosure. With reference to FIG. 1A, an exemplary computer network system 100 comprises a natural language processing engine (NLPE) 101 in communication with a local client terminal 114, as well as with a remote client terminal 115 and a knowledge base 120. NLPE 101 receives a query from either local client terminal 114 via a direct connection, or from remote client terminal 115 via, for instance, a network 119. To process the query as described herein, NLPE 101 may refer to knowledge base 120, either locally or via network 119.

Each of client terminals 114 and 115 may be representative of many diverse computers, systems, including general-purpose computers (e.g., desktop computer, laptop computer, etc.), network appliances (e.g., set-top box (STB), game console, etc.), and wireless communication devices (e.g., cellular phones, personal digital assistants (PDAs), pagers, or other devices capable of receiving and/or sending wireless data communication). Further, each of client terminals 114 and 115 may include one or more of a processor, a memory (e.g., RAM, ROM, Flash, hard disk, optical, etc.), one or more input devices (e.g., keyboard, keypad, mouse, remote control, stylus, microphone, touching device, etc.) and one or more output devices (e.g., display, audio speakers, etc.). Moreover, each of client terminals 114 and 115 may be equipped with a browser stored in a memory and executed by a processor. The browser may facilitate communication with NLPE 101 through network 119 or via a local connection.

FIG. 1B shows the logical components of NLPE 101, according to an exemplary embodiment of the subject disclosure. In the illustrated implementation, NLPE 101 may comprise one or more logical units that are capable of receiving an input query 117 from one or more clients 114, processing the request using processor 116, and returning the appropriate results. NLPE 101 may comprise a sentence parsing module 102 for statistically parsing an input sentence and retrieve a plurality of phrases or clauses, and for generating a syntactic structure for the sentence. NLPE 101 may further include a clause recognition module 103 for examining the syntactic structure and recognizing one or more main and sentence-level subordinate clauses within the input sentence or phrase, enabling creation of a phrase-level syntactic structure, as well as phrase-level records for one or more noun or verb phrases within a clause. The verb and noun phrases are recognized based on parsing operations executed by a verb tense analysis module 104, a verb part analysis module 105, a noun phrase analysis module 106, a preposition phrase analysis module 107, and a supplement and subordinate clause analysis module 108. The operations of each of these modules are further described herein. For instance, each phrase-level record and entity-level record generated by each of these modules may comprise a tuple for storing a syntactic structure for each of a subject part, a verb part, and object parts of each clause, respectively. Entities may be identified based on recognized nouns that are correlated or linked to a corresponding plurality of entities found in an external knowledge base. An entity-level syntactic structure based on noun and prepositional phrases in the corresponding part of the tuple may be generated. NLPE 101 may further comprise a co-reference resolution module 109 for linking multiple entities within an input sentence or plurality of sentences, and resolving ambiguities among the multiple entities. An entity-filtering module 110 is used to correlate the resolved entities with the knowledge base, and eliminate impossible or unlikely entities, and find new entities corresponding to the resolved entities from the co-reference resolution operations. A tuple exporting module 111 may be invoked to generate a sentence-level semantic structure based on a set of candidate entities. A plurality of tuples comprised by the sentence-level semantic structure may be used to form a query, to generate results from search engines, information retrieval systems, or web semantic systems, etc.

NLPE 101 may be hosted on a server or a server environment, such as a server for a local area network or wide area network, a backend for such a server, or a Web server. In this latter environment of a Web server, the logical components of NLPE 101 may be implemented as one or more computers that are configured with server software to host a site on the Internet, such as a Web site for the provided service. The server that hosts NLPE 101 may include a processor 113, a memory (e.g., RAM, ROM, Flash, hard disk, optical, RAID memory, etc.). For purposes of illustration, the modules comprised by NLPE 101 are only illustrated as discrete blocks stored in a memory, although it is recognized that such programs and components reside at various times in different storage components and may be distributed across a plurality of servers.

Figure 2:
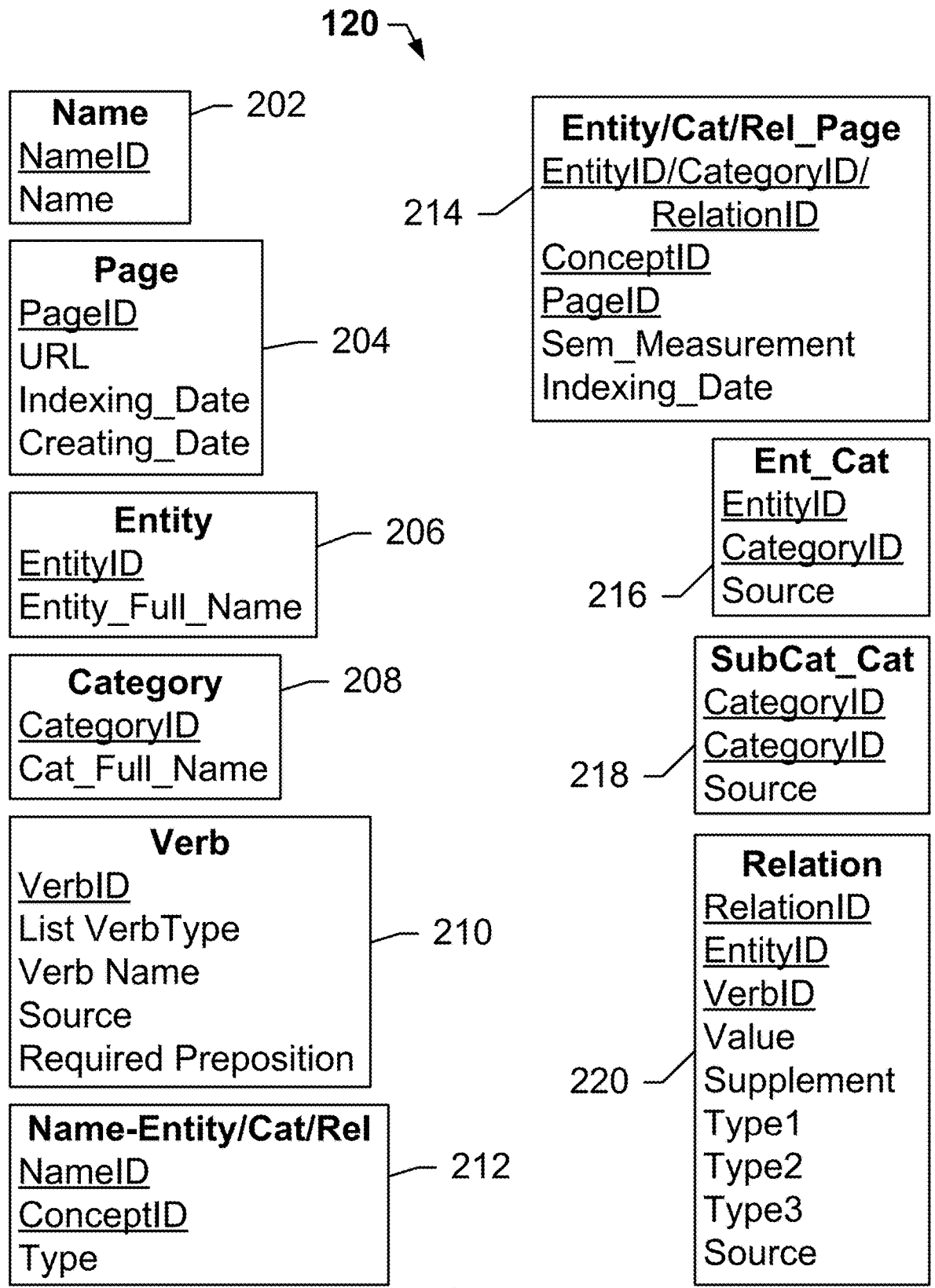
FIG. 2 shows a knowledge base, according to an exemplary embodiment of the subject disclosure.

FIG. 2 shows a knowledge base, according to an exemplary embodiment of the subject disclosure. As described herein, an NLPE refers to a knowledge base (KB) to perform entity recognition and other operations. With reference to FIG. 2, KB 120 comprises a plurality of tables and a corresponding plurality of records within each table. An exemplary table and record layout is shown, and any other layout may be appreciable by those having ordinary skill in the art in light of reading this disclosure and without detracting from the inventive spirit and scope of this disclosure. For instance, name table 202 stores one record for each determined name of an entity, a category or a relation. Page table 204 stores one record for each indexed web document. Entity table 206 stores one record for each concept that is a proper noun or a common noun. Category Table 208 stores one record for each determined category. Verb table 210 stores one record for each determined verb. Entity/Category/Relation table 212 stores one record for each name, as identified by the NameID field from the Name table 202, that is mapped to a concept, identified by the ConceptID field. The "type" column in table 212 specifies whether the ConceptID can be an EntityID, for instance, when "type=1", a CategoryID, for instance when "type=2", or a RelationID, for instance, when "type=3". The Entity/Category/Relation table 214 stores one record for each index determined from an entity, a category, or a relation, to a document. For instance, the entity may be identified by the EntityID field in table 206, a category may be identified by the CategoryID field in table 208, and a relation may be identified by the RelationID field in table 214. The Entity_Category table 216 stores one record for each relation that is determined to belong from an entity, as identified by the EntityID field, to a category, as identified by the CategoryID field. The SubCat_Cat table 218 stores one record for each relation that is determined to belong to a sub-category from a category. Finally, relation table 220 stores one record for each determined concrete relation of (EntityID, VerbID, Value). For instance, the Type1 field specifies whether the Value can be an EntityID (when Type1=1) or a real-world value (when Type1=2). Similarly, the Type2 field specifies whether this record is created in the initialization phase of the KB (when Type2=1) or in the updating phase of the KB during learning via analysis of several documents (when Type2=2). The Type3 field specifies whether this record represents an inclusive property of the source entity (when Type3=1) or an exclusive property of the source entity (when Type3=2). The supplement field stores additional information of the relation.

For each table in KB 120, the underlined column in a table is the key column. Each table can have some additional meta-data. KB 120 may be considered an expanded or improved version of existing knowledge bases or data repositories such as electronic encyclopedias. For instance, in Wikipedia®, one entity has a unique name and one corresponding page, but in the KB 120, one name can refer to several entities and several names can refer to one entity. This relation may further be specified by the Name-Entity/Cat/Rel table 212. In KB 120, one entity may further be indexed in several pages, and this indexing may be specified by the Ent/Cat/Rel_Page table 214. The relations from an entity to a category and between categories may be analogous to those in existing knowledge bases such as Wikipedia. However, the information retrieval mechanism in KB 120 is different than with other general knowledge repositories. For instance, a query submitted to KB 120 is treated as a search on a name with or without a corresponding type. From the returned list of ConceptIDs in the Name-Entity/Cat/Rel table 214 and the corresponding type, other relevant information can be retrieved from the KB 120.

Figure 3A:
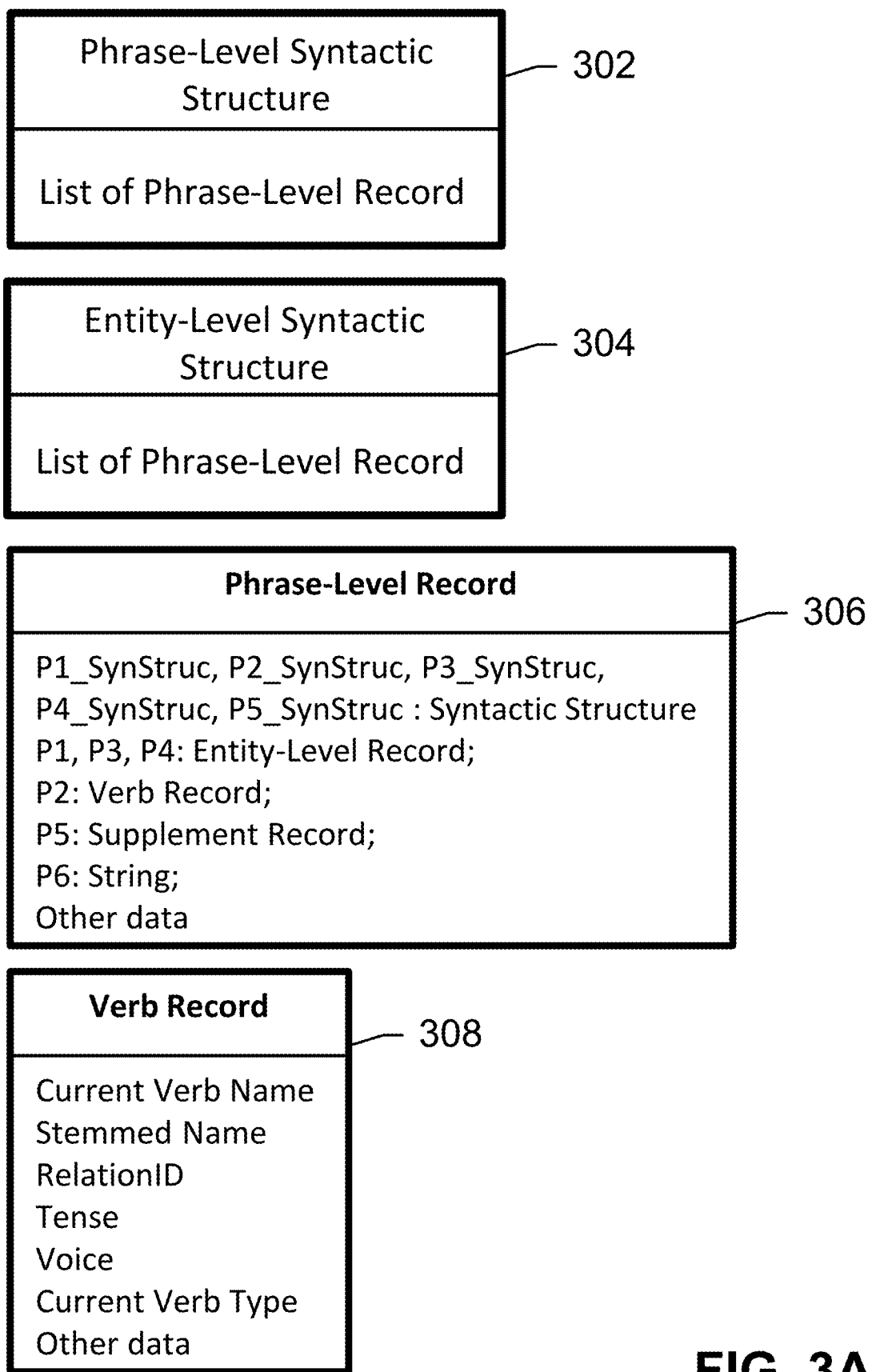
FIGS. 3A and 3B show a plurality of data structures used by an NLPE, according to an exemplary embodiment of the subject disclosure.
Figure 3B:
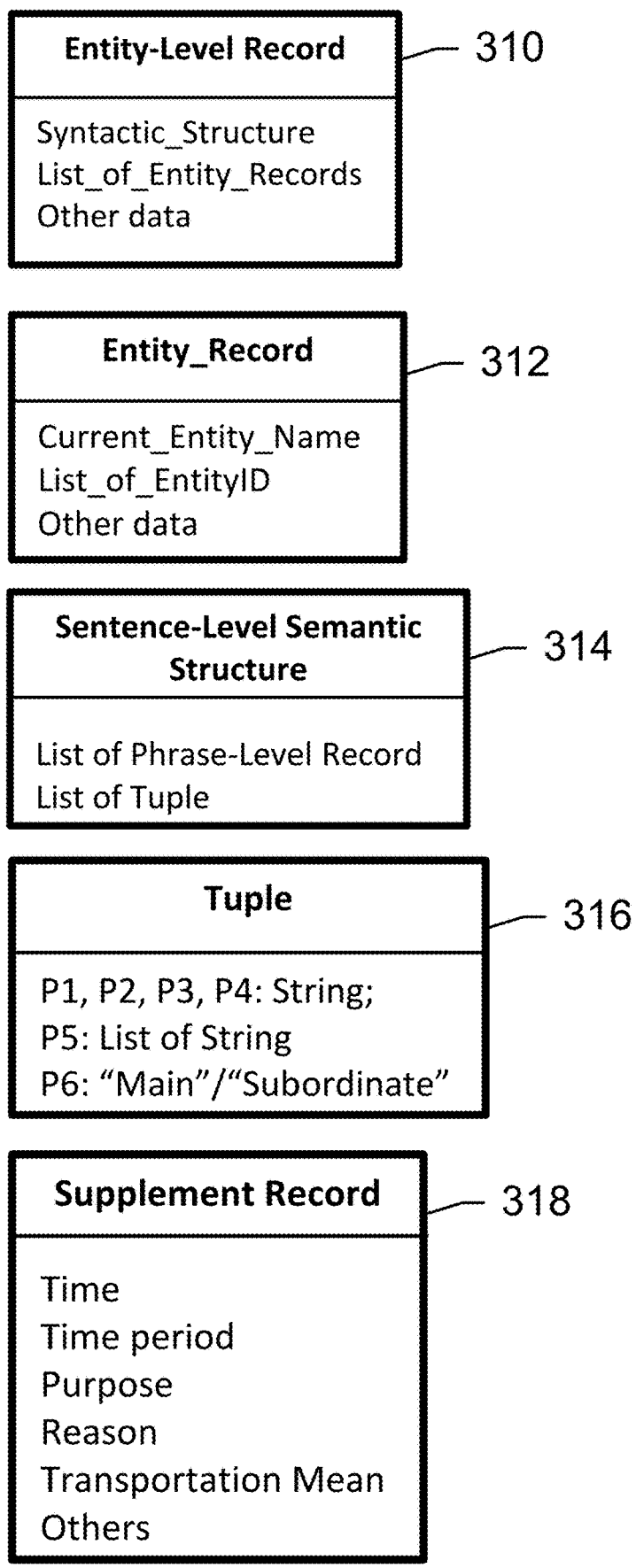

FIGS. 3A-3B show a plurality of data structures used by an NLPE, according to an exemplary embodiment of the subject disclosure. These data structures enable generation of tuples, recognition of clauses within an input sentence, and linking of entities with the knowledge base described herein. An exemplary set of data structures is shown, and any other layout may be appreciable by those having ordinary skill in the art in light of reading this disclosure and without detracting from the inventive spirit and scope of this disclosure. For instance, a phrase-level syntactic structure 302 stores the information of a sentence in a list within a phrase-level record 306. Within phrase-level record 306, only parts P1_SynStruc, P2_SynStruc, P3_SynStruc, P4_SynStruc and P5_SynStruc may be populated with syntactic structures. A syntactic structure is a tree structure that is the output of a statistical parser, as further described herein and with reference to FIG. 5. The entity-level syntactic structure 304 is initialized with the list of its corresponding phrase-level record 306 as phrase-level syntactic structure 302, except that all other fields within the corresponding phrase-level record 306 may be populated. Alternatively or in addition, the entity-level syntactic structure 304 may be also added with one or more additional phrase-level record 306 when populating these other fields.

Each phrase-level record 306 stores information related to one clause that is determined to be within an input sentence. For example, a phrase-level record 306 may comprise a tuple of (P1, P2, P3, P4, P5, P6), in which, P1, P2, P3, P4, P5 represents for the subject part, the verb part, the direct object, the indirect object and the supplementary part of the clause, respectively, and P6 stores the type of the clause, which is either "Main", "Subordinate" or "Query". Alternatively or in addition, one clause may be represented by one or more phrase-level records 306. Moreover, a verb record 308 stores information related to the main verb phrase within a clause. The current name of the main verb may be stored, as well as the stemmed verb of the current verb, the RelationID of the stemmed verb in the KB 200 (see verb table 210), the current tense (e.g., simple present, simple future, etc.), the current voice (active or passive), the current verb type (e.g., intransitive, transitive, phrasal, etc.) and so on.

With reference now to FIG. 3B showing additional exemplary data structures, an entity-level record 310 stores information related to a noun phrase within a clause, including its syntactic structure and a list of entity records from entity record table 312. Entity record table 312 stores the current entity name and the list of corresponding EntityIDs for the current entity name. An EntityID may comprise any one EntityID from the entity table 206 in the knowledge base. Each EntityID from entity table 206 represents an entity in the knowledge base. Due to the ambiguous manner of natural languages such as English, the current entity name may point to several entities within a knowledge base. Therefore, an entity record 312 stores a list of EntityIDs corresponding to each of said several entities. For example, a noun phrase "Bill and Jean" may be stored in one entity-level record 310 that comprises two entity records 312. A first entity record 312 for "Bill" comprises all EntityIDs that correspond to a plurality of entities identified as "Bill" within a knowledge base. A second entity record 312 for "Jean" similarly comprises all EntityIDs that are identified with the name "Jean" within the KB.

A sentence-level semantic structure 314 may store any information related to a sentence, such as a list of phrase-level records 306 that are filled within entity-level syntactic structure 304, as well as a list of tuples 316. A tuple 316 comprises a set of (T1, T2, T3, T4, T5, T6), in which, T1, T3 and T4 are EntityID in the external knowledge base, for instance as stored in entity table 206. T2 comprise a VerbID in the knowledge base, corresponding to the verb table 210. T5 comprises the metadata of the clause. For instance, metadata may include a time as detected by a preposition or other word (e.g. "at noon", "yesterday", "tomorrow", etc.), a location as detected by a preposition (e.g. "in the office", or "at home", etc.). Further, a supplement record 318 stores additional information about the clause, including time period, purpose, reason, transportation means, etc. T6 comprises the type of the tuple, such as "Main", "Subordinate" or "Query".

Figure 4:
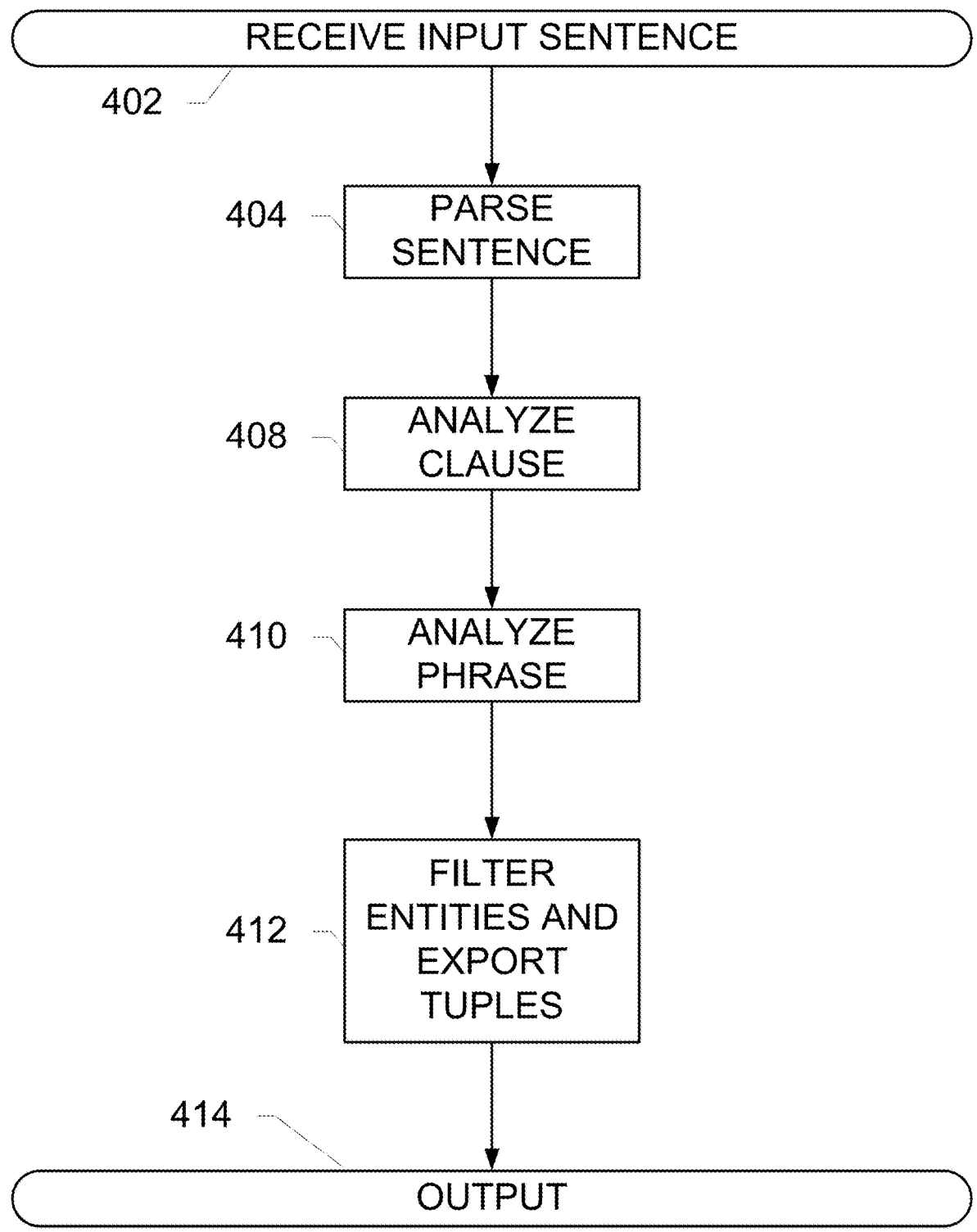
FIG. 4 shows a method for parsing an input sentence, according to an exemplary embodiment of the subject disclosure.

FIG. 4 shows a method for parsing an input sentence, according to an exemplary embodiment of the subject disclosure. As described earlier, although four discrete method steps are shown, the operations described herein may be paired or grouped differently depending upon the source sentence/query, or may be performed in a different order, so long as the inventive scope and spirit is preserved that enables the NLPE to analyze an input and to produce the semantic structure of the input sentence. Moreover, the input may be a paragraph or article, series of articles, chapter in a book, entire book, webpage, or even a phrase or one or more keywords. In this exemplary embodiment, an input sentence may be received 402 by a client, either via a network or via a local terminal interface. The input sentence is parsed 404 to create the syntactic structure of the sentence. A clause analysis operation 408 includes examining the syntactic structure of the sentence to create a phrase-level syntactic structure. The phrase may be analyzed 410 within the phrase-level syntactic structure to create an entity-level syntactic structure. Subsequently, entity filtering and tuple exporting operations 412 are performed to examine the entity-level syntactic structure and to construct the sentence-level semantic structure. The sentence-level semantic structure and other structures and tuples are output 414. The details of these operations will be further described herein with reference to the remaining figures.

Figure 5:
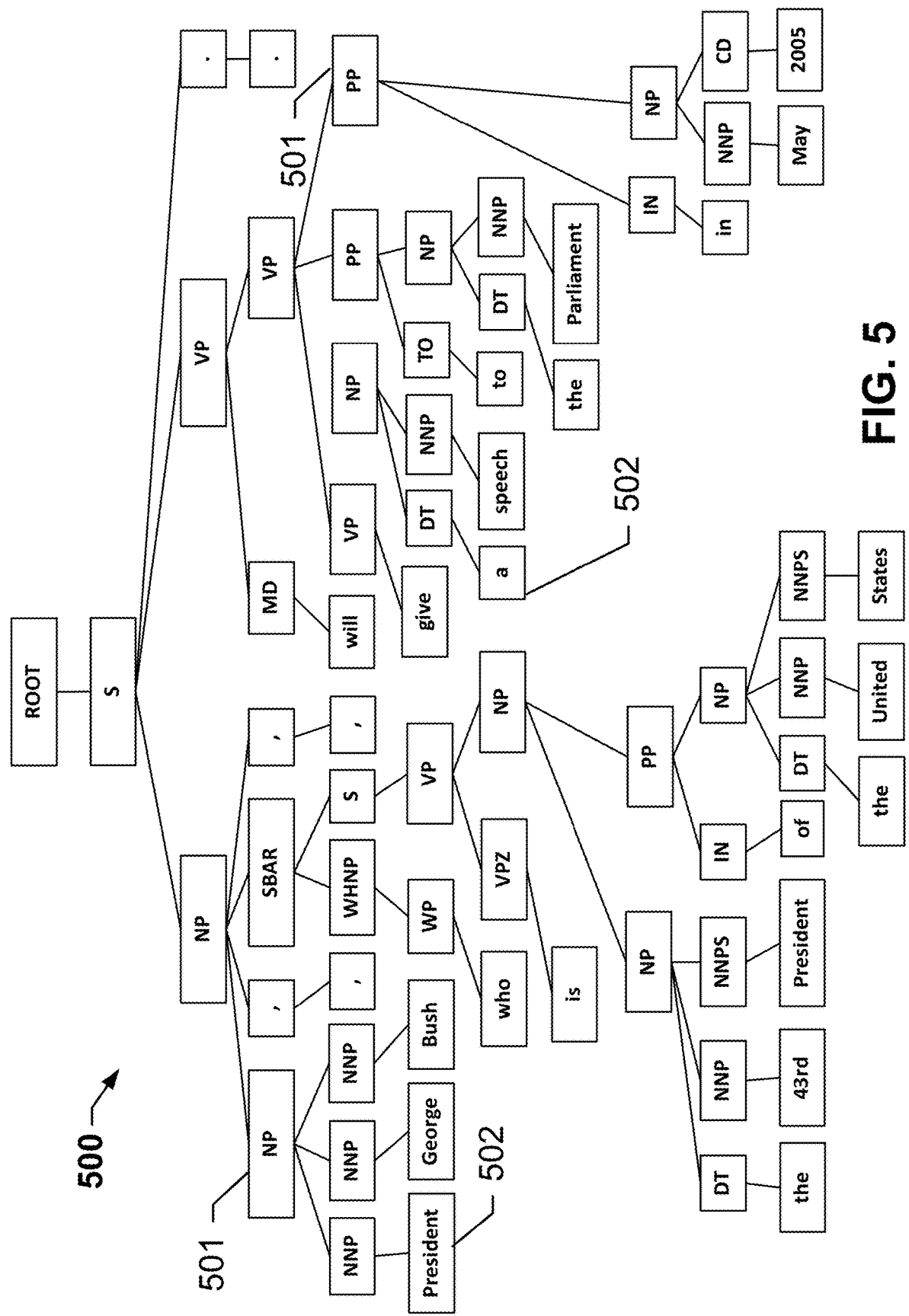
FIG. 5 shows a syntactic structure of a sentence, according to an exemplary embodiment of the subject disclosure.

FIG. 5 shows a syntactic structure 500 of a sentence, according to an exemplary embodiment of the subject disclosure. The exemplary sentence used to generate syntactic structure 500 is "President George Bush, who is the 43rd President of the United States, will give a speech to the Parliament on May 2005." Referring again to the method of FIG. 4, the sentence may be parsed by a statistical parser, such as the Stanford parser available at: http://nlp.stanford.edu/software/lex-parser.shtml to generate the syntactic structure 500 of the sentence. Although the syntactic structure 500 of the exemplary sentence "President George Bush, who is the 43rd President of the United States, will give a speech to the Parliament in May 2005." is graphically shown in FIG. 5, a text output of the same syntactic structure may be represented as follows:

```
(ROOT
   (S
      (NP
         (NP (NNP President) (NNP George) (NNP Bush))
         (, ,)
         (SBAR
            (WHNP (WP who))
            (S
               (VP (VBZ is)
                  (NP
                     (NP (DT the) (JJ 43rd) (NN President))
                     (PP (IN of)
                        (NP (DT the) (NNP United) (NNPS States)))
                  ))))
         (, ,))
      (VP (MD will)
         (VP (VB give)
            (NP (DT a) (NN speech))
            (PP (TO to)
               (NP (DT the) (NNP Parliament)))
            (PP (IN in)
               (NP (NNP May) (CD 2005)))))
      (. .)))
```

The names of the middle nodes such as NP, PP, etc., are defined by the PENN tag, which is explained at http://www.comp.leeds.ac.uk/amalgam/tagsets/upenn.html. However, any standard nomenclature may be used. The names of the leaf nodes 502 may be words in the exemplary sentence. The graphical and textual representations of syntactic structure 500 may be used interchangeably for the purposes of the subject disclosure.

In natural languages, a sentence may include one or more main clauses and additional subordinate clauses. Each subordinate clause supports the meaning for one phrase in a main clause, or the entire main clause. There are generally two types of subordinate clauses: clause-support subordinate clause and phrase-support subordinate clause. A clause-support subordinate clause is a clause that supports the meaning of the main clause. For examples, in the sentence "if he is late, he cannot take that bus", the conditional phrase "if he is late" is a clause-support subordinate clause. Adverbial phrase is also an example of clause-support subordinate clauses. A phrase-support subordinate clause is a clause that supports the meaning of a phrase in the main clause. For example, the main clause "President George Bush will give a speech to the Parliament in May 2005" and the phrase-support subordinate clause of "who is the 43rd President of the United States" provide meaning for the noun phrase "President George Bush".

Figure 6:
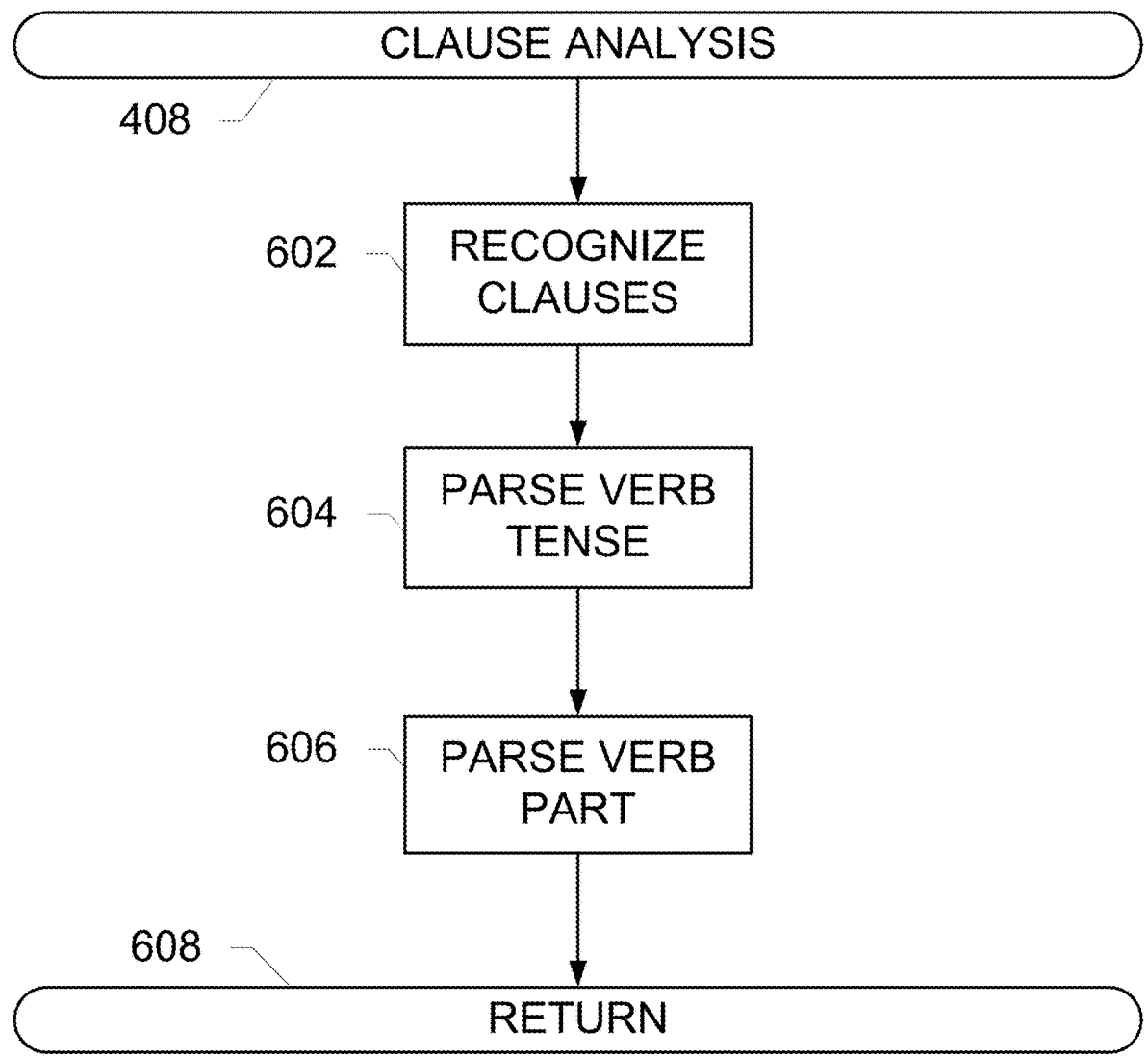
FIG. 6 shows a method for clause analysis, according to an exemplary embodiment of the subject disclosure.

FIG. 6 shows a method for clause analysis, according to an exemplary embodiment of the subject disclosure. The clause analysis operation 408 enables construction of the phrase-level syntactic structure, such as data structure 312 in FIG. 3B. Although three discrete method steps are shown, the operations described herein may be paired or grouped differently depending upon the source sentence/query, or may be performed in a different order, so long as the inventive scope and spirit is preserved that enables the NLPE to perform clause analysis operation 408. According to this method, a clause recognition operation 602 extracts the main clause and clause-support subordinate clauses and creates corresponding phase-level records, such as records 306. The clause recognition operation 602 may be enabled by matching existing sentence templates with the syntactic structure of the input sentence to extract the main clause and clause-support subordinate clauses. A sentence template is a syntactic structure that may be predefined in the system. A parse verb tense operation 604 parses each extracted clause to extract the main verb part and to create a verb record, such as verb record 312. A parse verb part operation 606 analyzes the extracted verb part from parse verb tense operation 604 to fill the information in each part of the generated phrase-level record.

Figure 7A:
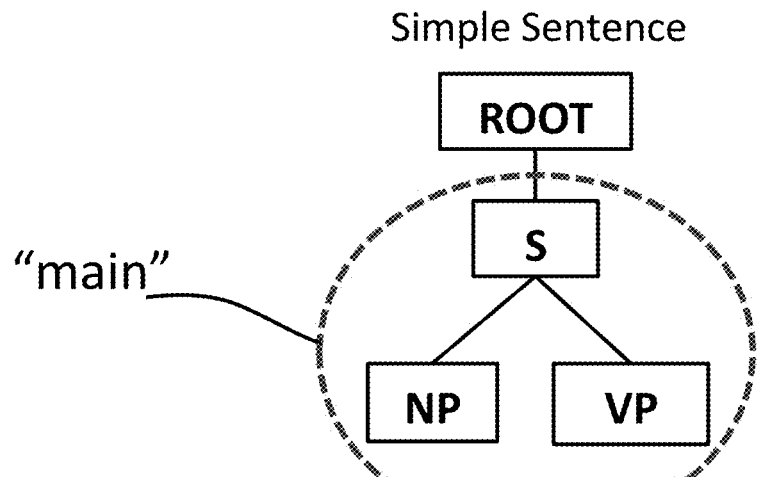
FIGS. 7A-7D show a plurality of sentence templates, according to an exemplary embodiment of the subject disclosure.
Figure 7B:
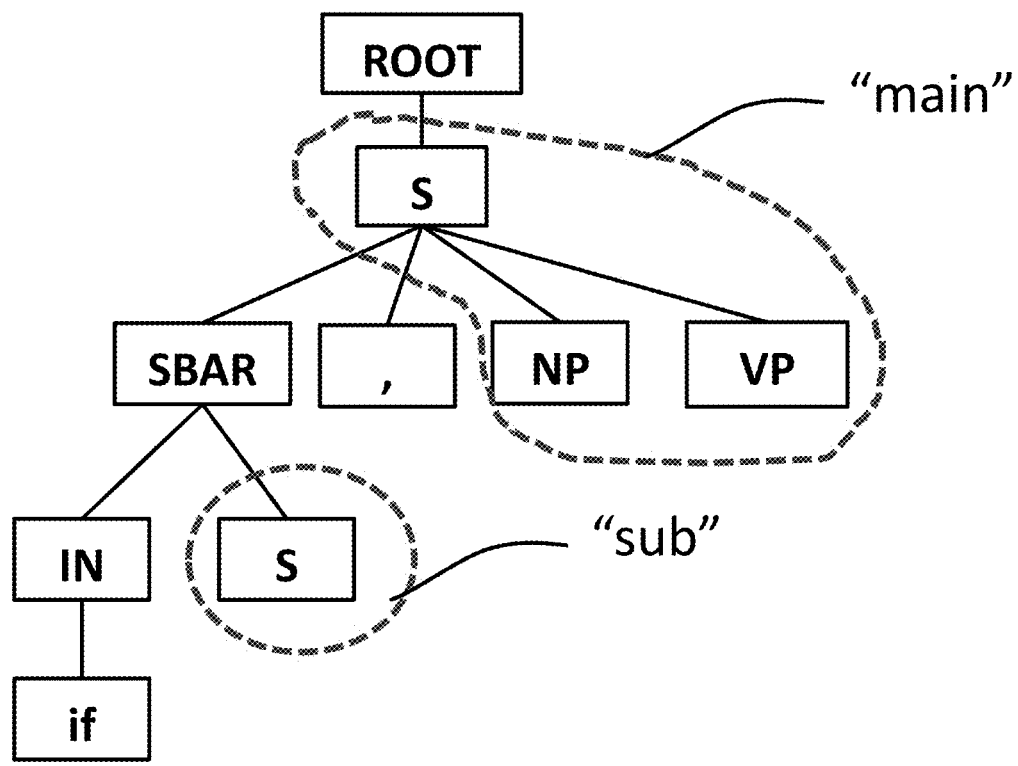
Figure 7C:
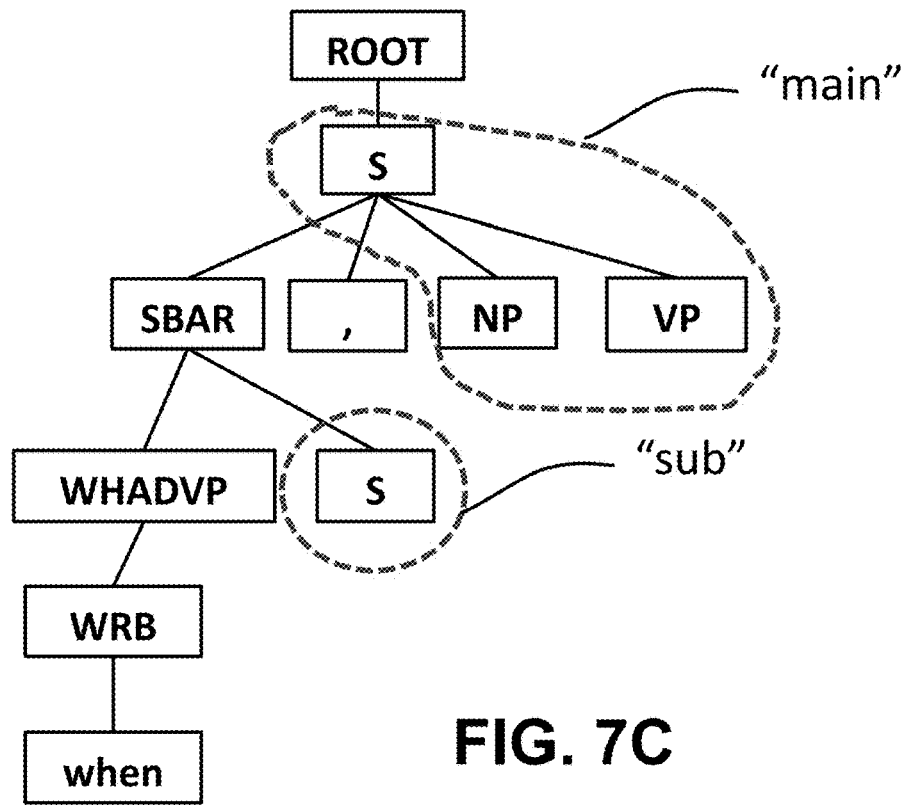
Figure 7D:
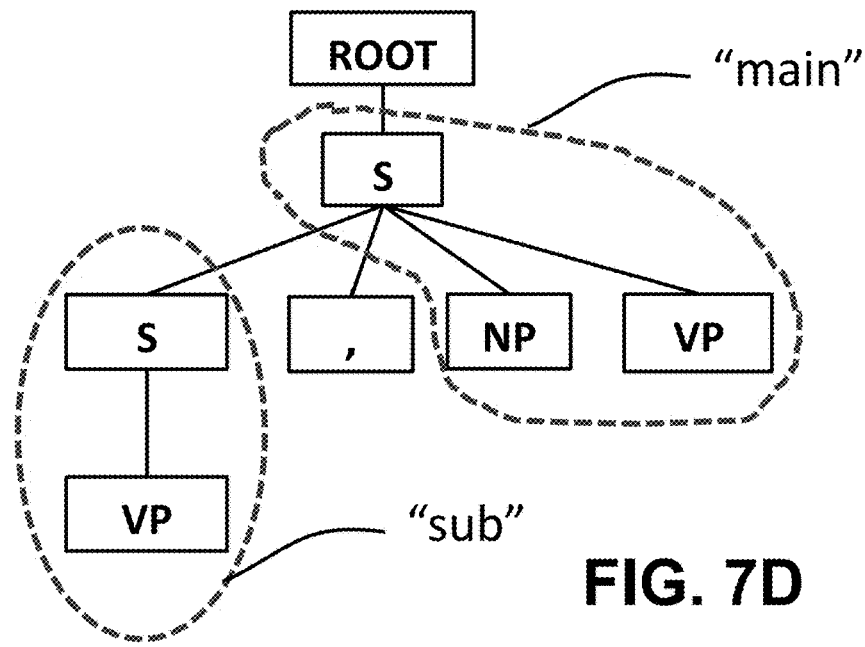
Figure 8A:
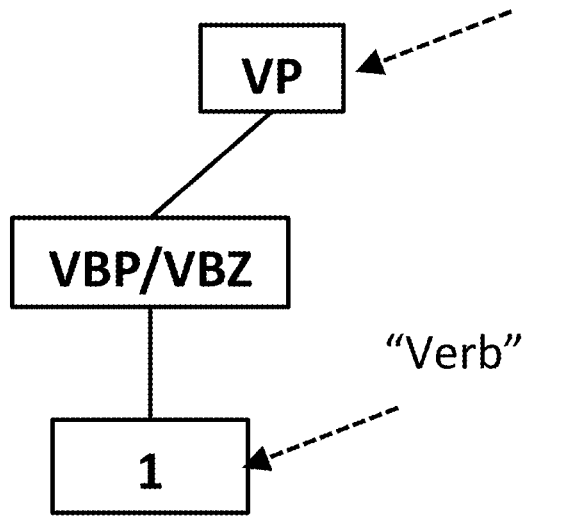
FIGS. 8A-8D show a plurality of verb tense templates, according to an exemplary embodiment of the subject disclosure.
Figure 8B:
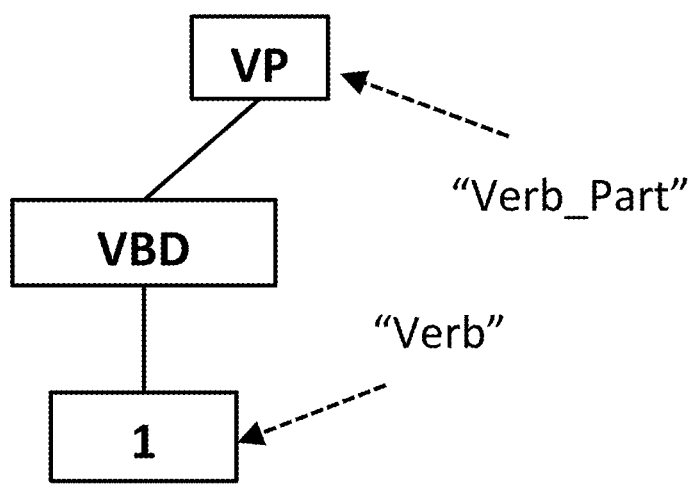
Figure 8C:
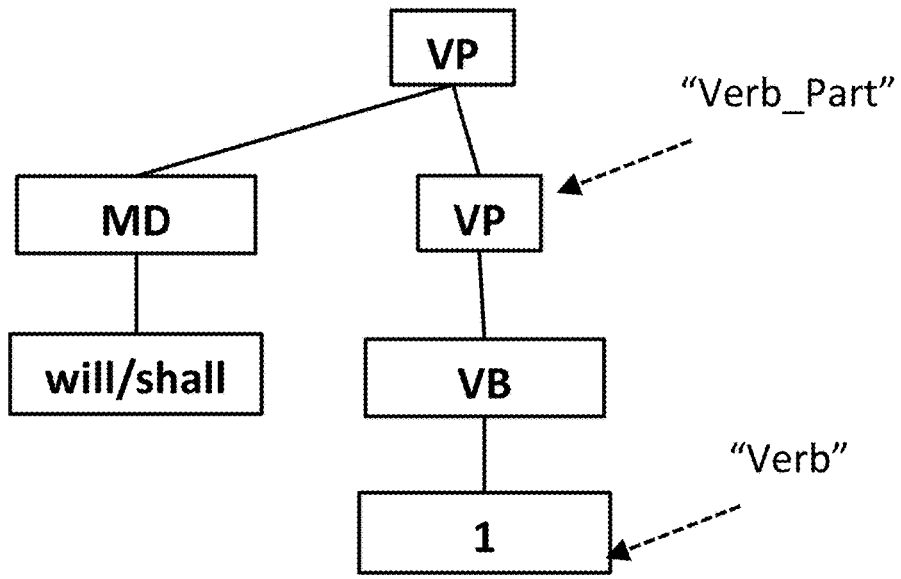
Figure 8D:
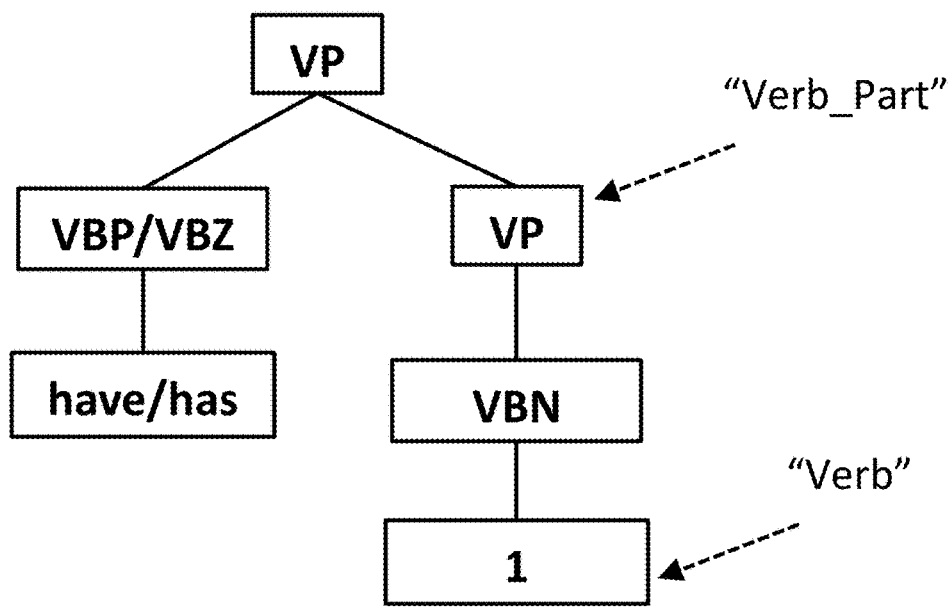
Figure 9A:
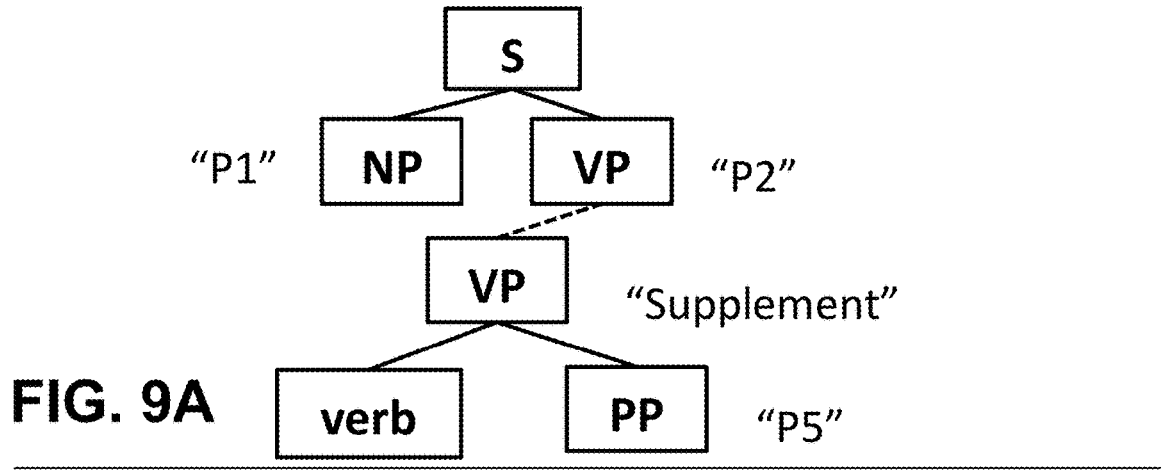
FIGS. 9A-9G shows a plurality of verb types, according to an exemplary embodiment of the subject disclosure.
Figure 9B:
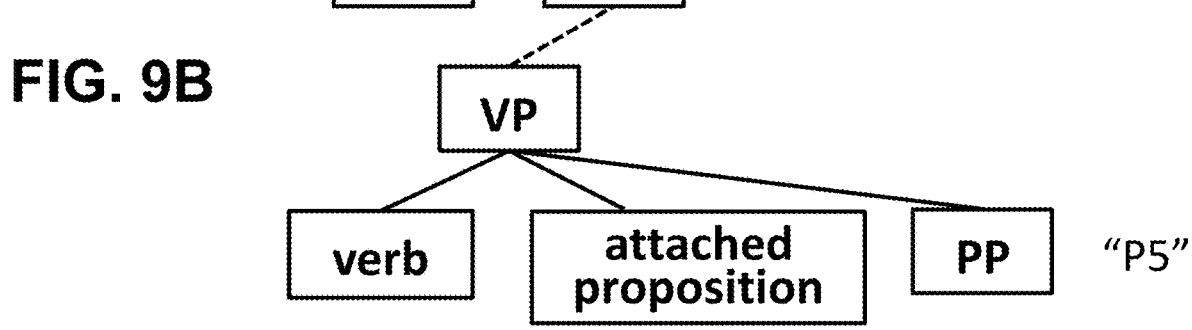
Figure 9C:
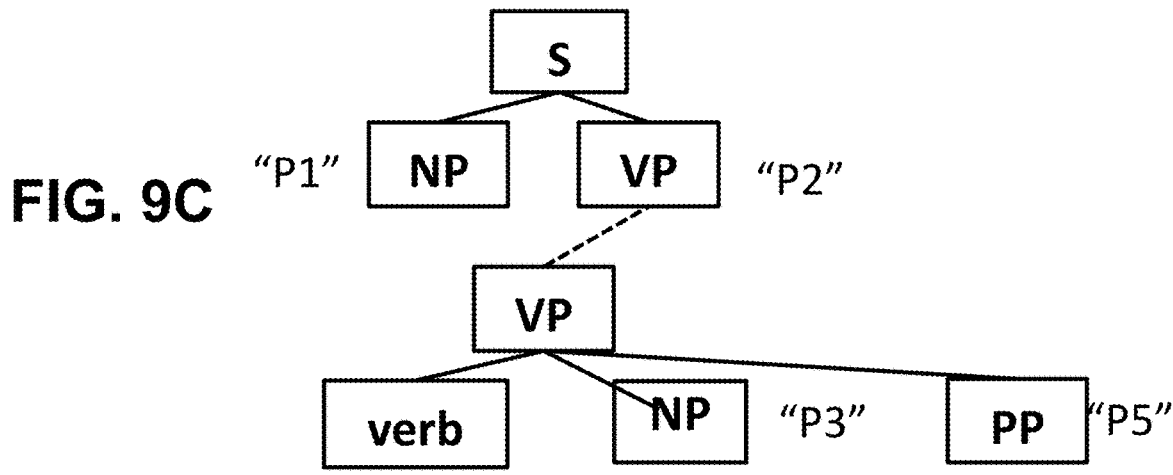
Figure 9D:
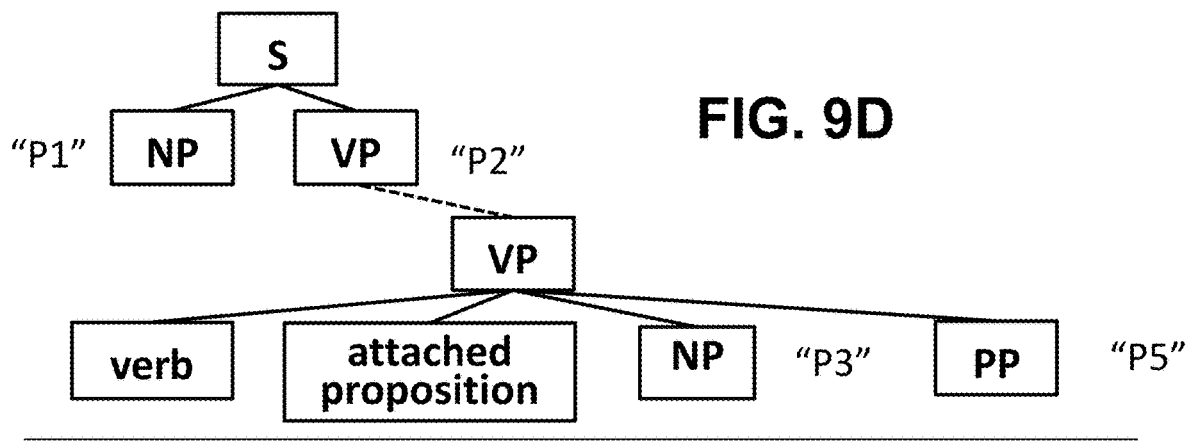
Figure 9E:
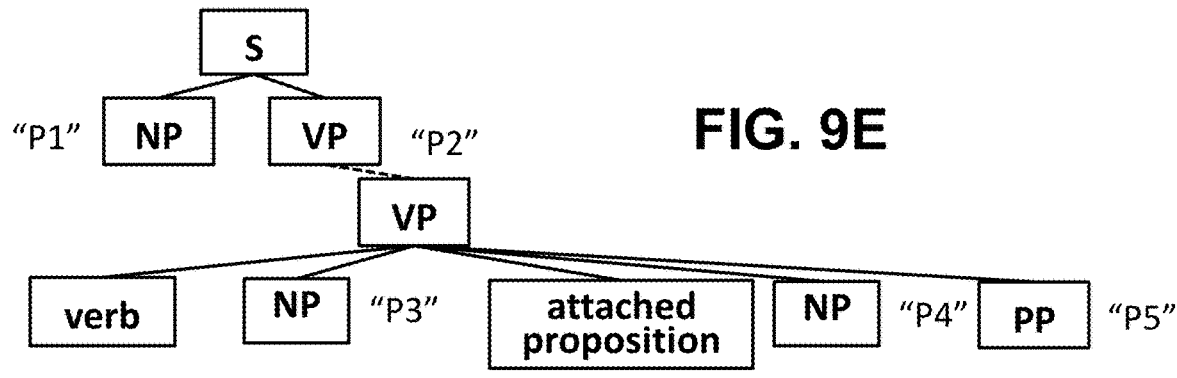
Figure 9F:
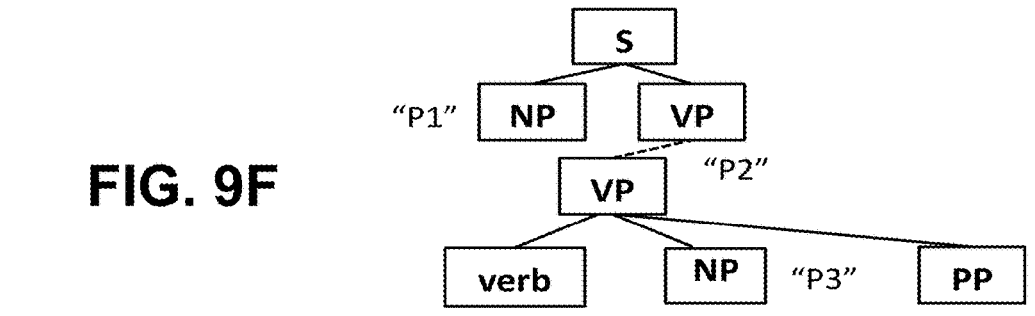
Figure 9G:
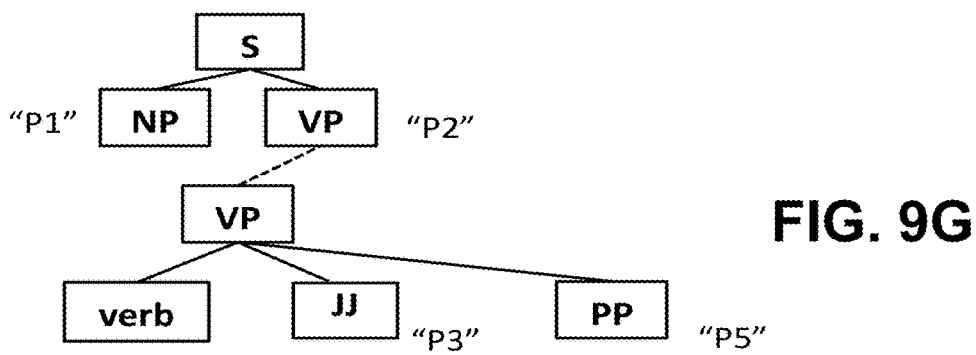

FIGS. 7A-7D show several sentence templates that may be used to enable clause recognition operation 602. Generally, a sentence template is a syntactic structure that may be predefined in the system. FIG. 7A shows the sentence template for a simple sentence, i.e. one that has a noun part followed by a verb part. FIG. 7B shows a template for a conditional sentence. FIG. 7C shows a template for a sentence with a "when" clause, and FIG. 7D shows a template for a sentence with a leading phrase and having an implicit subject. To recognize clauses as performed in step 602, the root node of a sentence template may be matched with the root of the syntactic structure, and each child node in the sentence template may be matched with a child node of the syntactic structure. This operation may generally follow a "top-down, left-right" order, although this order may be adjusted based on the organization of the syntactic structure. Two nodes are matched if their labels are the same. A sentence template may be considered "matched" with the syntactic structure if all its required nodes are exactly matched with the nodes of syntactic structure. If such a match is found, then the matching operation stops, and the syntactic structures of the main clause and subordinate clauses are specified by the zones that are covered by the dashed line and labeled "main" (for the main clause) or "sub" (for a subordinate clause). As described herein, a phrase-level record is created to store the information for each specified clause. The phrase-level syntactic structure keeps the list of the created phase-level records 306, and may also store the relation between clauses for further use. For instance, referring to FIG. 7D, the sentence template "Sentence with a leading phrase with an implicit subject" may be used for sentences such as "To earn money, he works hard". In such cases, the subject part of the clause-support subordinate clause is implicit and supposed to be the subject of the main clause. To process such cases, when creating the phrase-level record of the clause-support subordinate clause, the method may refer to the P1 variable of this record's tuple to the P1 variable in the phrase-level record of the main clause. Making such a reference ensures that the phrase-level record of the clause-support subordinate clause has the correct P1.

Referring again to the method of FIG. 6, the parse verb tense operation 604 matches verb tense templates with the syntactic structure of the VP part in each clause. The syntactic structure of a clause always has one or more nodes that are labeled "VP". The sub-tree starting with this VP node is hereinafter referred to as the "VP part" of a clause. Generally, a verb tense template is a syntactic structure that is pre-defined in the system, similar to a sentence template. The parse verb tense operation 604 uses a similar matching method as previously described with reference to the clause recognition. During matching, a template node with a label "1" can match with one node with any label and a template node with label "*" can match with zero or many nodes with any label.

FIGS. 8A-8D show a plurality of verb tense templates, according to an exemplary embodiment of the subject disclosure. These verb tense templates represent some common tenses in the English language. When finding a matched verb tense template, the verb of the clause may be extracted at the position that is specified by the node labeled "Verb" or "Verb_Part" in the matching verb tense template. The extracted verb may be stemmed to its root form by a transforming table that is defined in advance in the system. The matching with the verb tense template enables creation of a verb record, such as record 312, that consists of the information of the verb phrase in a clause. This information may include, among others, the current surface form of extracted verb, stemmed form of the extracted verb, verb tense, positive or negative form, active or passive voice, etc. In addition, the syntactic structure of the verb part (VP) is extracted from the VP syntactic structure at the node labeled "Verb_Part" in the verb tense template. The verb part syntactic structure will be used in the next step to extract supplement parts of the clause.

Referring again to FIG. 6, the parse verb part operation 606 analyzes the verb part extracted from the parse verb tense operation 604, to fill the information in each part of phrase-level record 306. The parse verb part operation 606 matches a verb usage template with the extracted verb part to find the most matched verb usage template.

FIGS. 9A-9G, in conjunction with Table 1, shows a plurality of verb types, according to an exemplary embodiment of the subject disclosure. Table 1 identifies a plurality of verb types and their corresponding to verb usage patterns, and links each verb type to one of FIGS. 9A-9G that represent the appropriate verb usage template. A verb usage pattern identifies a way that a verb can be used in a sentence. For example, a transitive verb such as "kick" requires a direct object as a noun phrase in a sentence "a boy kicks a ball", such that the verb "kick" uses a verb usage pattern "NP+verb+someone/something+none+Supplement" in a natural-language sentence. Every verb in the English language is necessarily attached with one or several verb types in a pre-defined dictionary. In some embodiments, this pre-defined dictionary may be manually edited. In either case, the verb usage templates depicted in FIGS. 9A-9G show the syntactic structure of the corresponding verb usage patterns from Table 1. The dashed lines in FIGS. 9A-9G imply zero or several steps between two nodes.

TABLE 1

| Verb Type | Verb Usage Pattern | Verb Usage Template |
|---|---|---|
| (Intransitive Verb) Example: "appear" | NP + verb + none + none + Supplement | FIG. 9A |
| (Intransitive Verb with an attached preposition) Example: "ask in" | NP + verb + attached preposition + none + none + Supplement | FIG. 9B |

TABLE 1-continued

| Verb Type | Verb Usage Pattern | Verb Usage Template |
|---|---|---|
| (Transitive Verb) Example: "ask" | NP + verb + something/someone + none + Supplement | FIG. 9C |
| (Transitive Verb with a preposition) Example: "look after" | NP + verb + attached preposition + NP + none + Supplement | FIG. 9D |
| (Transitive Verb with a far-away attached preposition) Example: "ask for" | NP + verb + something/someone + attached preposition + something/someone + Supplement | FIG. 9E |
| (Verb with to-infinitive) Example: "need" | NP + verb + to + verb + something + none + Supplement | FIG. 9F |
| (Linking verb) Example: "feel" | NP + verb + adjective + none + none + Supplement | FIG. 9G |

Referring again to FIG. 6, the parse verb part operation 606 detects all valid verb types of the stemmed verb (extracted from parse verb tense operation 604) from a predefined dictionary. Then, parse verb part operation 606 matches all valid corresponding verb usage templates with the found verb types and the verb part syntactic structure. If a match is determined between a verb usage template shown in FIGS. 9A-G and the verb part syntactic structure, the parse verb part operation 606 extracts these syntactic structures from the syntactic structure of the clause at the labeled nodes (e.g. "P1", P2", "P3" . . . ) in the verb usage template. Extracted syntactic structures are assigned to the corresponding parts of the phrase-level record of the clause, such as record 306. If there is no label in the verb usage templates that corresponds with a part in the phrase-level record, then that part is left empty, i.e. with a zero or "none" value.

Figure 10:
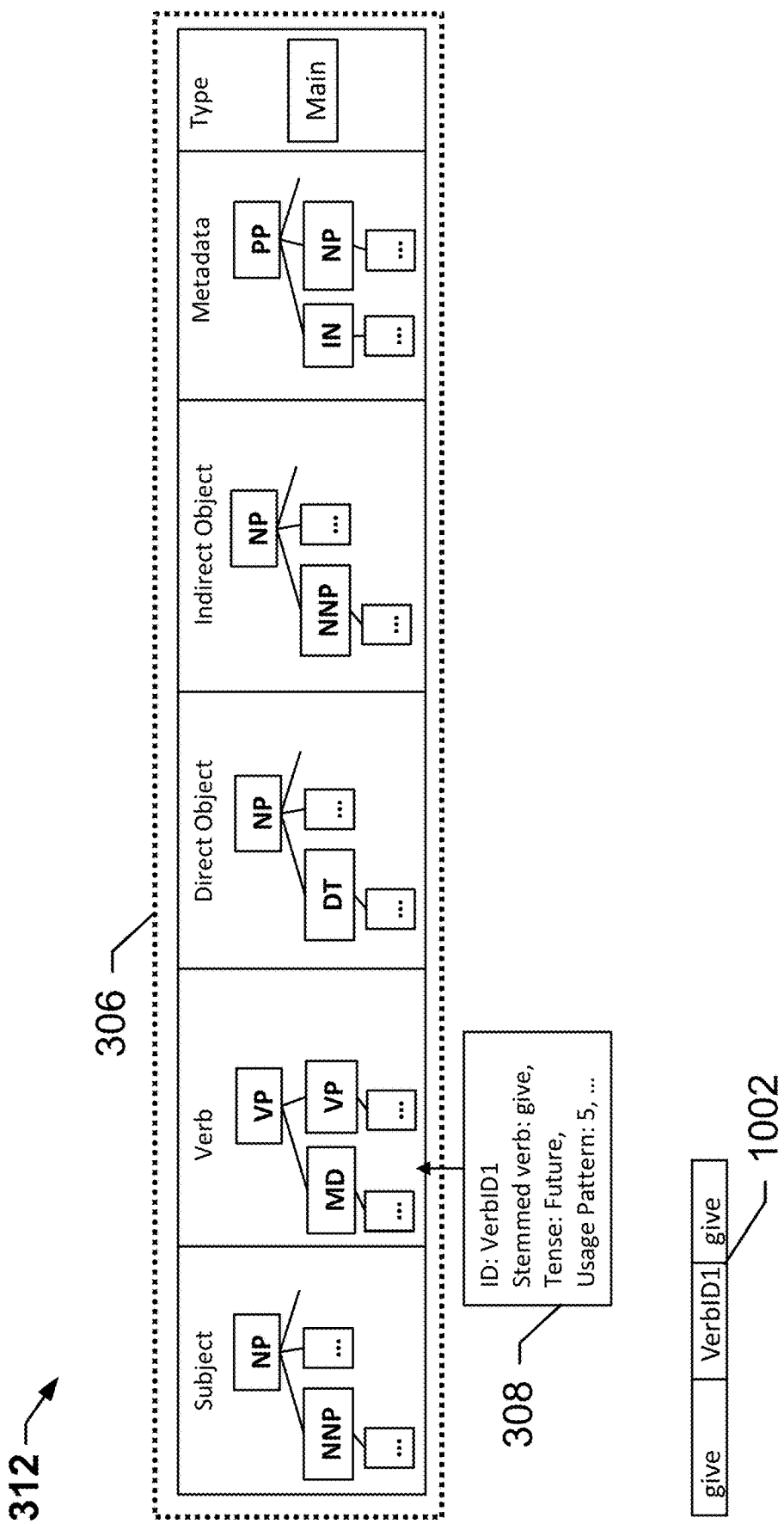
FIG. 10 shows a phrase-level syntactic structure of a sentence, according to an exemplary embodiment of the subject disclosure.

FIG. 10 shows a phrase-level syntactic structure of a sentence, according to an exemplary embodiment of the subject disclosure. As described herein, the phrase-level record stores information related to one or more clauses that are determined to be within an input sentence. For example, a phrase-level record may comprise a tuple of (P1, P2, P3, P4, P5, P6). Given an exemplary sentence discussed above with reference to FIG. 5, a clause analysis operation 408 may generate a phrase-level syntactic structure, as depicted in FIG. 10. The phrase-level record 306 for the main clause "President George Bush will give a speech to the Parliament on May 2005" is a tuple of the syntactic structures of phrases ("President George Bush", "give a speech to someone", "a speech", "the Parliament", "in May 2005", "Main"). A verb record 308 is also created for P2 of this phrase-level record 306. Mapping table 1002 is shown to explain the information of other parts in the figure and may not need to be included in the syntactic structure. In mapping table 1002, the first column is the current name of a verb or an entity in the text, the second column is the EntityID from a knowledge base, and the third column is the name of a verb or an entity in the knowledge base.

Figure 11:
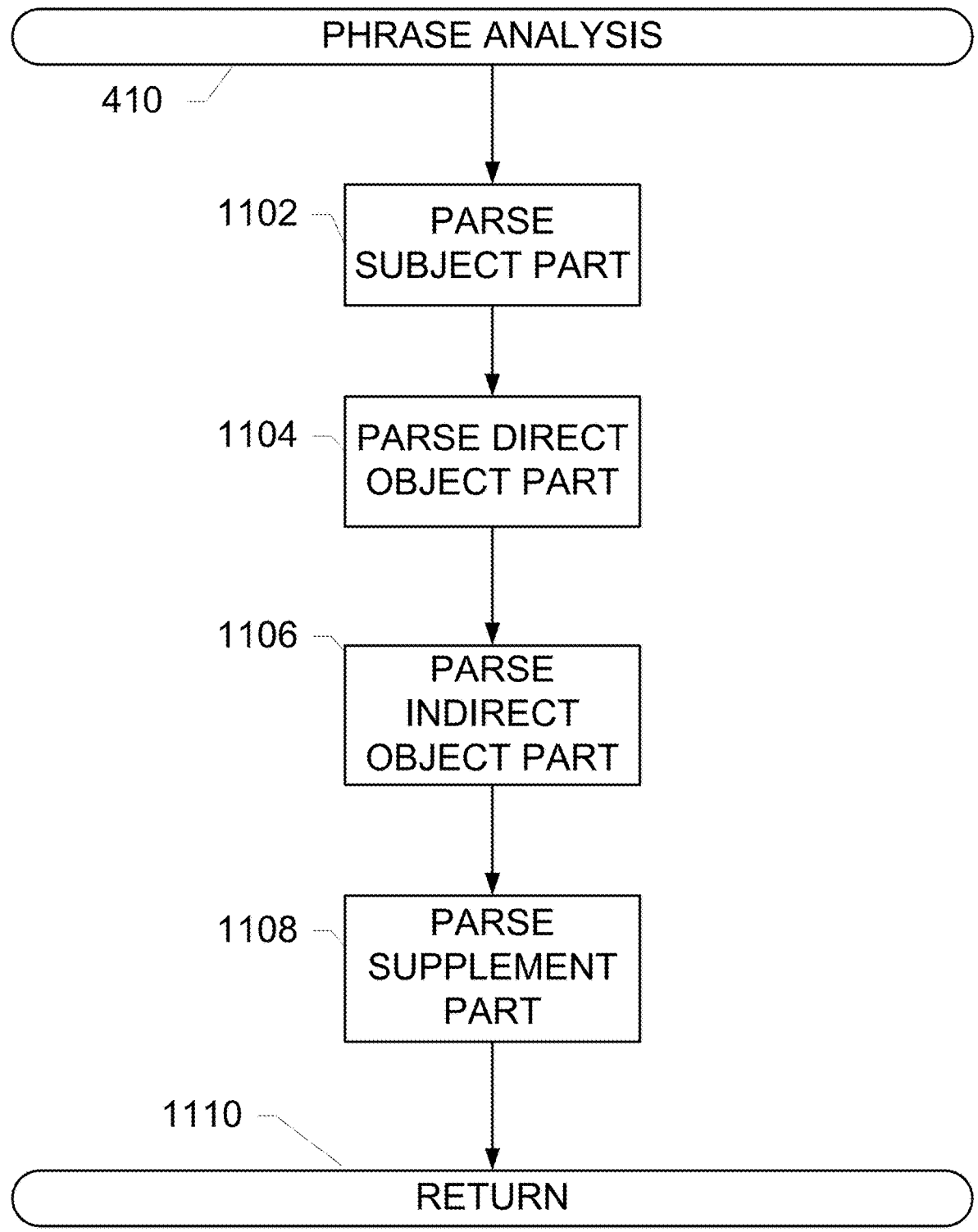
FIG. 11 shows a method for phrase analysis, according to an exemplary embodiment of the subject disclosure.

FIG. 11 shows a method for phrase analysis, according to an exemplary embodiment of the subject disclosure. Although four discrete method steps are shown, the operations described herein may be paired or grouped differently depending upon the source sentence/query, or may be performed in a different order, so long as the inventive scope and spirit is preserved that enables the NLPE to analyze an input phrase and to produce the semantic structure of the phrase. For example, the operations shown in FIG. 11 parse parts P1_SynStruc, P3_SynStruc, P4_SynStruc and P5_SynStruc of each phrase-level record, such as record 306. In each phrase-level record, parts P1_SynStruc, P3_SynStruc and P4_SynStruc are noun phrases, so that operations parse subject part 1102, parse direct object part 1104 and parse indirect object part 1106 utilize a parse noun phrase operation (see FIG. 12) to parse these parts. Part P5 of a phrase-level record is often a prepositional phrase. The parse supplement part operation 1108 is further described herein.

Figure 12:
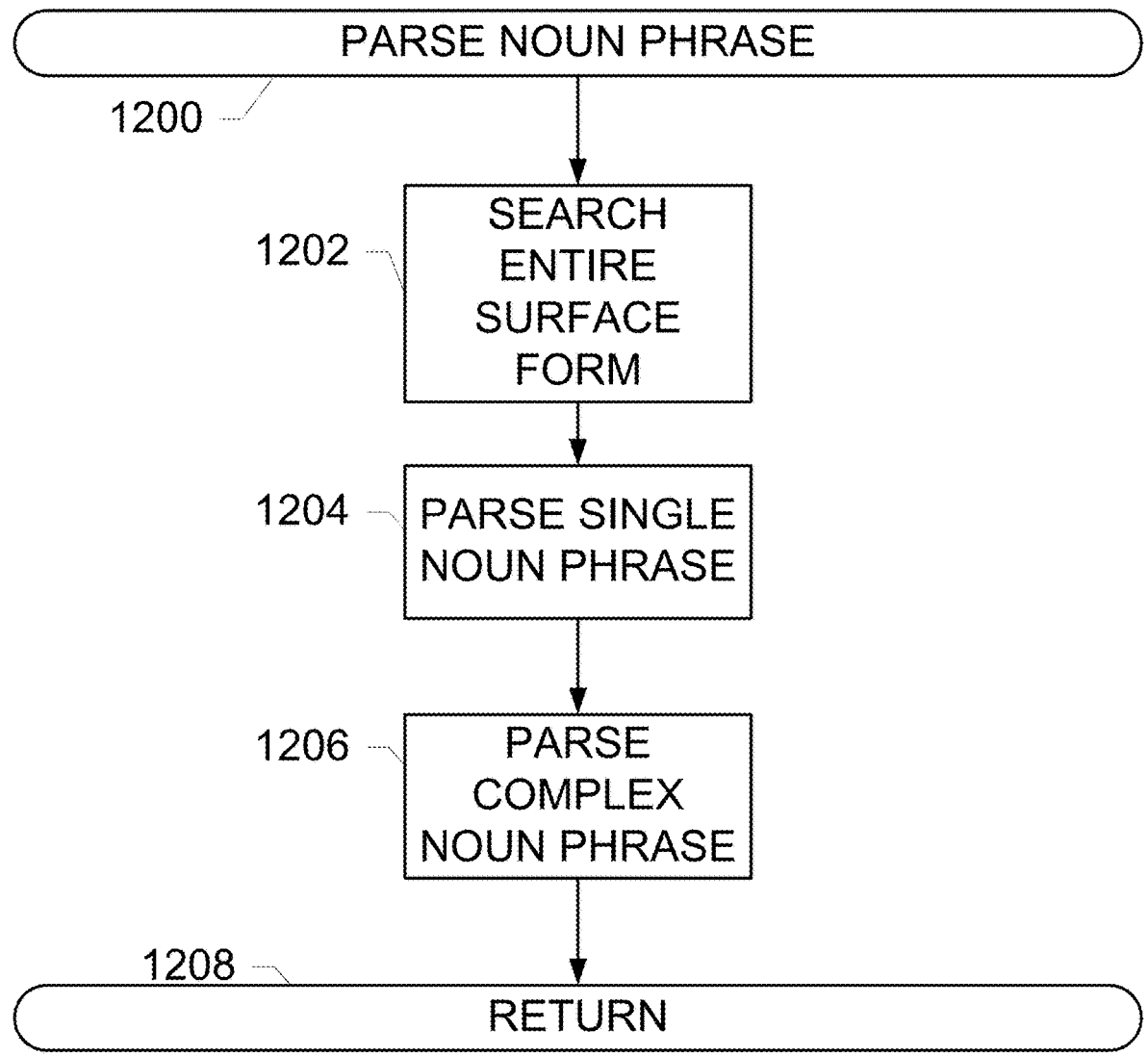
FIG. 12 shows a method for parsing a noun phrase, according to an exemplary embodiment of the subject disclosure.

FIG. 12 shows a method for parsing a noun phrase, according to an exemplary embodiment of the subject disclosure. The method begins with an operation for searching the entire surface form 1202. This operation searches the whole text form of the noun phrase as a single term in the knowledge base. If a match is found, an entity-level record is created, such as record 310, and returned 1208. For example, the phrase "the United States" can be found in the knowledge base and the parse noun phrase operation 1200 bypasses the remaining steps. If the entire surface form of the noun phrase cannot be found in the knowledge base, the parse single noun phrase operation 1204 is invoked to parse the noun phrase using templates as shown in FIGS. 13A-H. If operation 1204 results in successfully parsing the noun phrase, then the parse noun phrase method 1200 takes the returned entity-level record 310 from the parse single noun phrase 1204 as its results, and bypasses all remaining steps.

Figure 13A:
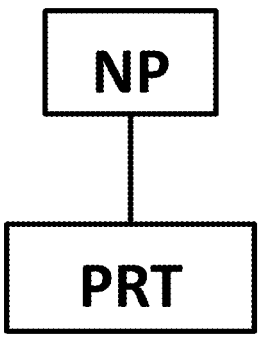
FIGS. 13A-H show a plurality of simple noun phrase templates, according to an exemplary embodiment of the subject disclosure.
Figure 13B:
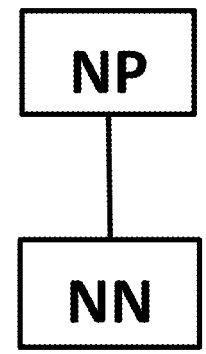
Figure 13C:
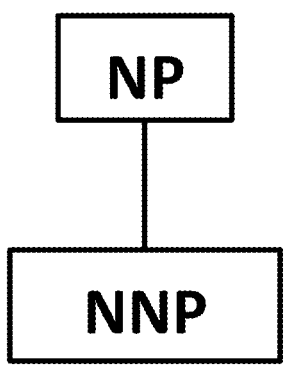
Figure 13D:
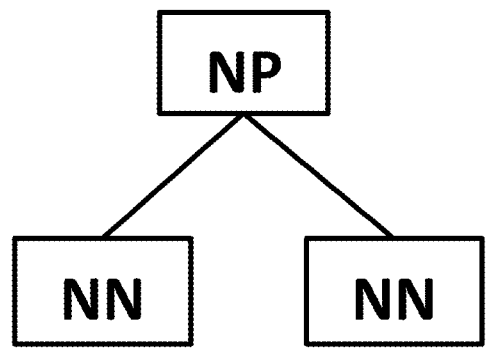
Figure 13E:
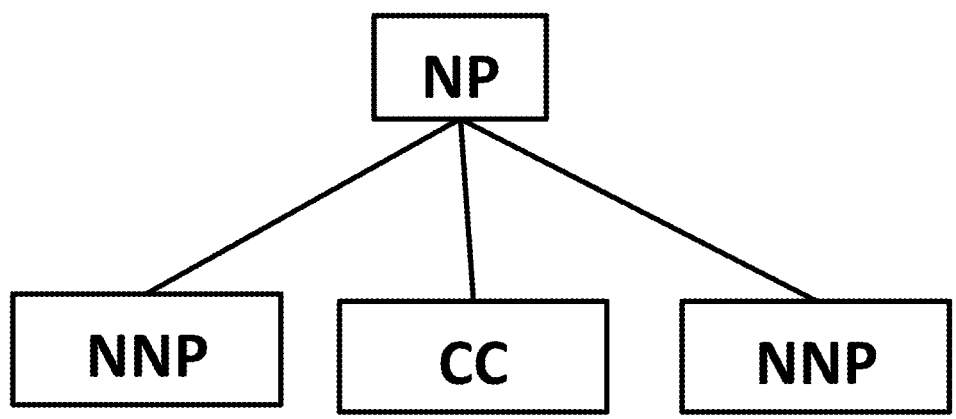
Figure 13F:
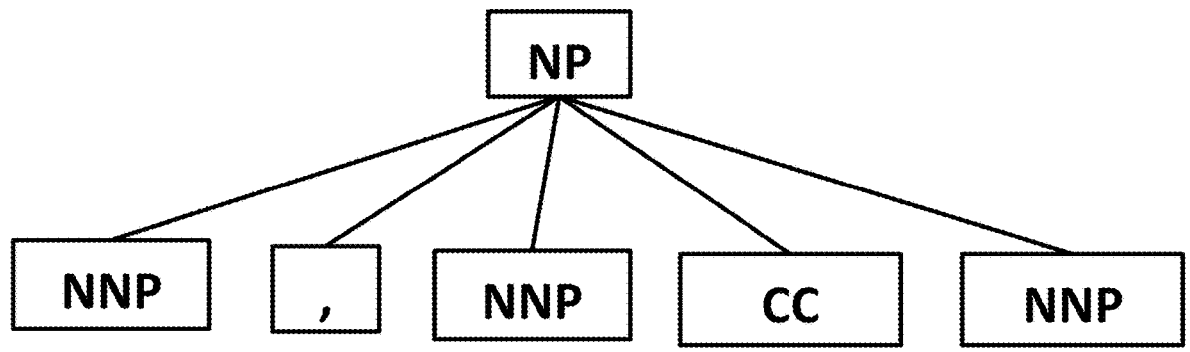
Figure 13G:
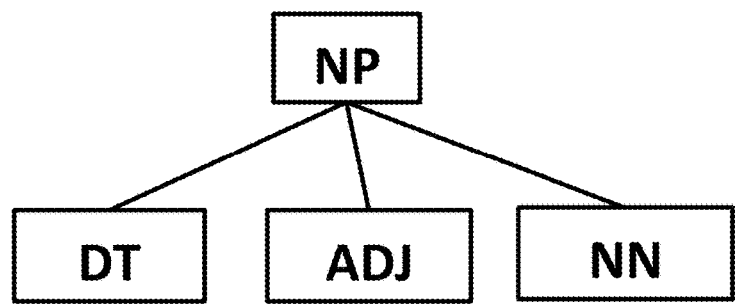
Figure 13H:
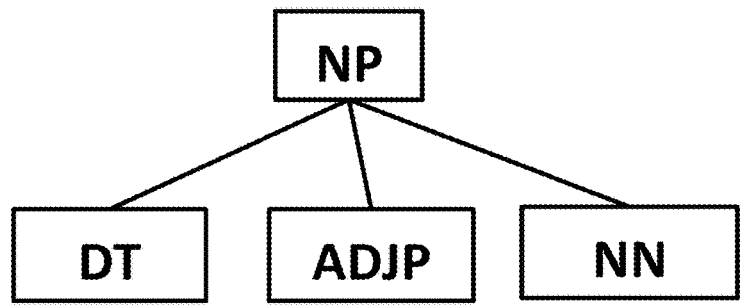

FIGS. 13A-H show a plurality of simple noun phrase templates, according to an exemplary embodiment of the subject disclosure. FIG. 13A shows the simple noun phrase template for a single pronoun. FIG. 13B shows the simple noun phrase template for a single common noun. FIG. 13C shows the simple noun phrase template for a single proper noun. FIG. 13D shows the simple noun phrase template for a compound common noun. FIG. 13E shows the simple noun phrase template for a simple compound noun phrase with two proper nouns. FIG. 13F shows the simple noun phrase template for a simple compound noun phrase with three proper nouns. FIG. 13G shows the simple noun phrase template for a noun phrase with an adjective. FIG. 13H shows the simple noun phrase template for a noun phrase with an adjective phrase. The parse single noun phrase operation 1204 matches simple noun phrase templates shown in FIGS. 13A-H to the syntactic structure of the noun phrase. If there is a matched template, the parse single noun phrase operation 1204 executes one of its corresponding sub-methods. For instance, if the simple noun phrase template "Single pronoun" from is matched, the parse single noun phrase operation 1204 stores the pronoun associated with the list of pronouns that will be resolved in the final step described further herein. For the other simple noun phrase templates, the parse single noun phrase operation 1204 determines entities mentioned from "head nouns". Mentioned entities are entities that are mentioned in the noun phrase and that exist in the knowledge base. The method searches from the right to the left of the noun phrase to find the longest string that is a name of an entity in the knowledge base. The longest string that is found is called the "head noun" of the noun phrase. Attributes of the "head noun" are also extracted from the nodes in the left of the "head noun" in the noun phrase, including a determiner (node with label "DT"), a number (node with label "CD"), other nouns (node with label "NN" or "NNP"), adjective (node with label "ADJ") and adjective phrases (node with label "ADJP"). The parse single noun phrase operation 1204 creates an entity-level record, such as record 310, from the "head noun" and its attributes, and returns this record as its result.

FIGS. 14A-D show a plurality of complex noun phrase templates, according to an exemplary embodiment of the subject disclosure. A noun phrase may be a complex noun phrase that can be a combination of several noun phrases, with additional prepositional phrases and subordinate clauses. FIG. 14A shows a complex noun phrase template for a set of two noun phrases. FIG. 14B shows a template for a set of three noun phrases. FIG. 14C shows a template for a noun phrase with a prepositional phrase. FIG. 14D shows a template for a noun phrase with a subordinate clause. The parse complex noun phrase operation 1206 from FIG. 12 is executed to match complex noun phrase templates depicted in FIG. 14 with the syntactic structure of the noun phrase. When matching a noun phrase template with the syntactic structure of a noun phrase, the parse complex noun phrase operation 1206 uses the same matching method as previously described. When there is a matched complex noun phrase template, operation 1206 uses various methods to construct an entity-level record, such as record 310.

With templates "Set of 2 Noun Phrases" depicted in FIG. 14A, "Set of 3 Noun Phrases" depicted in FIG. 14B, or similar templates, operation 1206 parses leaf NP nodes and then joins returned results to construct its result. The template for "Noun Phrase with a Prepositional Phrase" depicted in FIG. 14C is suitable for noun phrases such as "the population of Java", "a man with a big hat", etc. Using this template, parse complex noun phrase operation 1206 is recursively applied to parse the leaf NP node, and a parse prepositional phrase operation 1500 (see FIG. 15) is used to parse the leaf PP node. Each applied method returns an entity-level record, such as record 310. Depending on the preposition in the leaf PP node, one phrase-level record 306 is created to represent the relation between the leaf NP node and the leaf PP node. For example, if the preposition is "of" (the complex noun phrase as "NP_1 of NP_2"), the entity-level record ELR1 is returned by parsing NP1, entity-level record ELR2 is returned by parsing NP2, and a phrase-level record (ELR2, "have", ELR1, None, None, Subordinate) is created. If the preposition is "with" (the complex noun phrase as "NP_1 with NP_2"), a phrase-level record is created as (ELR1, "have", ELR2, None, None, Subordinate). The newly created phrase-level record will be added to the list of clauses of the sentence.

With template "Noun Phrase with a Subordinate Clause" depicted in FIG. 14D, the parse complex noun phrase operation 1206 is applied to parse the leaf NP node, and a parse subordinate clause operation 1600 (see FIG. 16) is applied to parse the leaf SBAR node. In this case, the subordinate (SBAR) clause is often a "Who/Which/That-clause", for example, clause "who is the 43rd President of the United States" in the exemplary sentence. When the parse single noun phrase operation 1106 parses the leaf NP node and returns an entity-level record ELR1 as its result, the parse subordinate clause operation 1400 may take this ELR1 as its reference.

Figure 15:
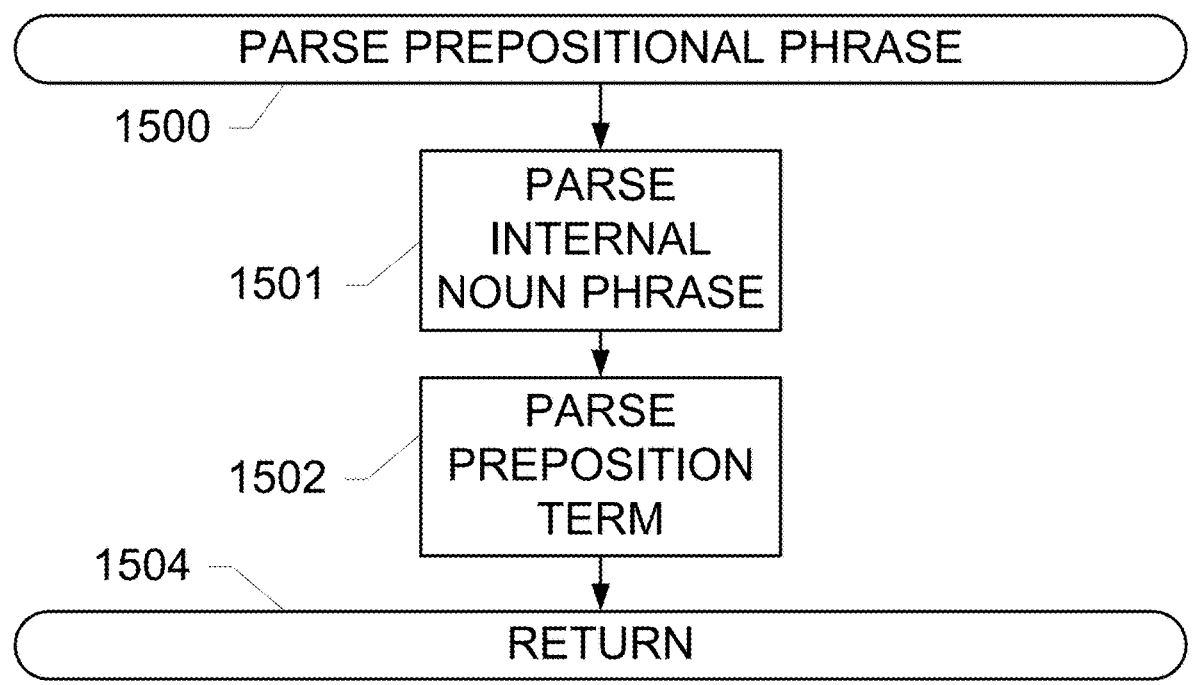
FIG. 15 shows a method for parsing a prepositional phrase, according to an exemplary embodiment of the subject disclosure.

FIG. 15 shows a method for parsing a prepositional phrase 1500, according to an exemplary embodiment of the subject disclosure. The syntactic structure of a prepositional phrase is often in the form "(PP (IN (preposition)) (NP))", with one preposition and an internal noun phrase. In this method, a parse internal noun phrase operation 1501 is executed to apply parse complex noun phrase operation 1206 (see FIG. 12) on the syntactic structure of the internal noun phrase. If required, a parse preposition term operation 1502 is also executed for any preposition in the noun phrase. An entity-level record 310 is returned 1504 as its result.

Figure 16:
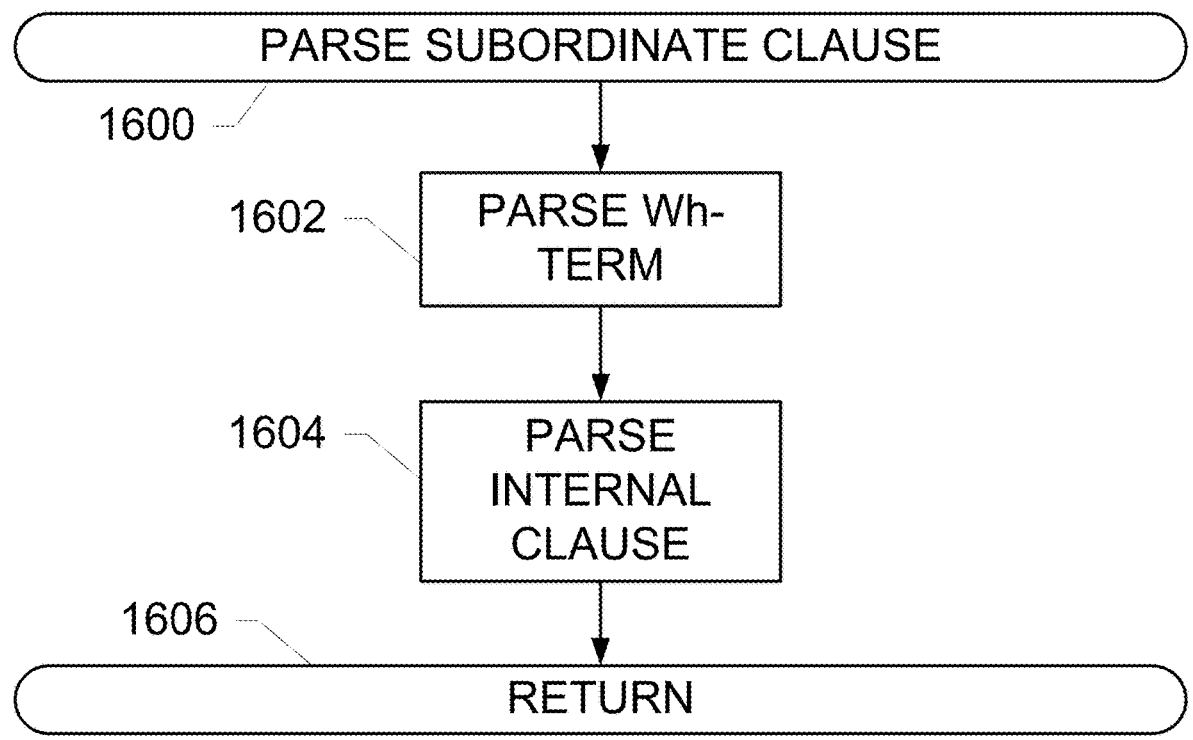
FIG. 16 shows a method for parsing a subordinate clause, according to an exemplary embodiment of the subject disclosure.

FIG. 16 shows a method for parsing a subordinate clause, according to an exemplary embodiment of the subject disclosure. This method 1600 requires a referenced entity-level record ELR1 (such as in record 310), and the syntactic structure of a clause as its input. A subordinate clause (SBAR) templates among those depicted in FIG. 17 is matched with the syntactic structure of a subordinate clause. If there is a matched SBAR template, a phrase-level record is created, such as record 306, and returned 1606 as its result. The parse Wh-term operation 1602 is executed to invoke the parse complex noun phrase operation 1206 on the Wh-part of the SBAR clause. Then, during execution of the parse internal clause operation 1604, for each node NP, the parse noun phrase operation 1100 is applied. For each node label VP, the parse verb tense operation 604 and parse verb part 606 are also applied.

Figure 17A:
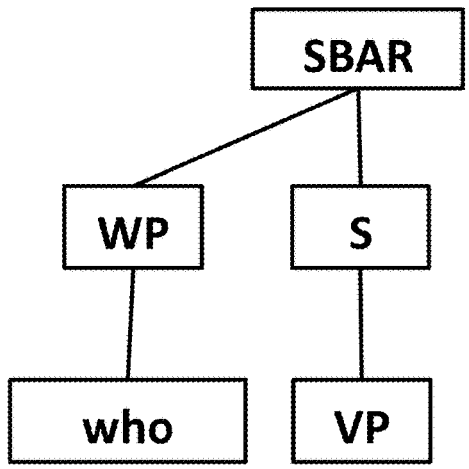
FIGS. 17A-D show a plurality of subordinate clause templates, according to an exemplary embodiment of the subject disclosure.
Figure 17B:
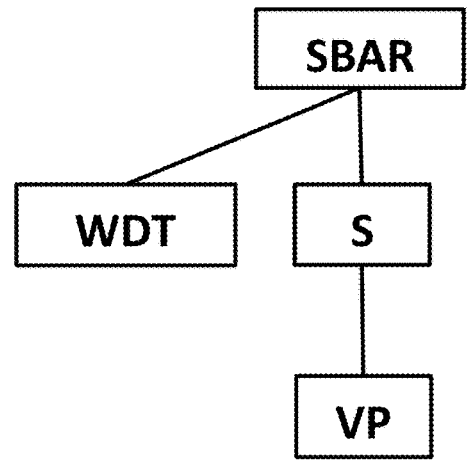
Figure 17C:
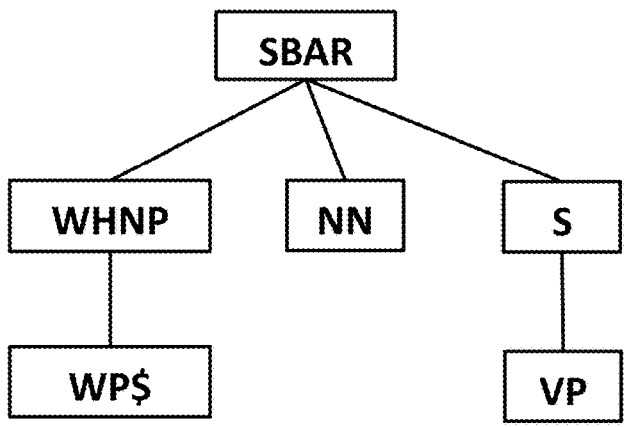
Figure 17D:
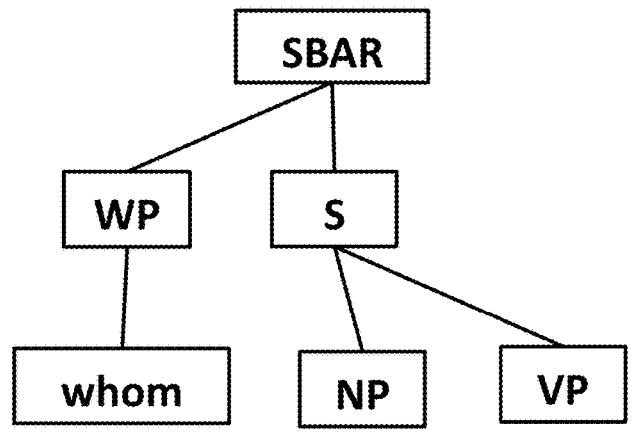

FIGS. 17A-D show a plurality of subordinate clause (SBAR) templates, according to an exemplary embodiment of the subject disclosure. FIG. 17A shows a who-clause template. FIG. 17B shows a that/which-clause template. FIG. 17C shows a whose-clause template. FIG. 17D shows a whom-clause template. The referenced entity-level record ELR1 is used in various ways depending on the matched SBAR Template. With SBAR templates "Who-clause" or "That/Which-clause", the referenced Entity-Level Record ELR1 is acted upon as the subject part. With SBAR templates "Whose-clause", the node with label NN is acted upon as the subject part, and a phrase-level record 306 is created to represent a relation between the referenced entity-level record ELR1 and the subject part ("ELR1" have "NN"). With SBAR templates "Whom-clause", the referenced entity-level record ELR1 is acted upon as the object part of the internal clause (i.e. a tree starts with node S).

The supplement part of a clause is often a nested prepositional phrase. The parse supplement part operation 1108 recursively applies the parse prepositional phrase operation 1500 to construct a supplement record 318 in the phrase-level record.

Figure 18:
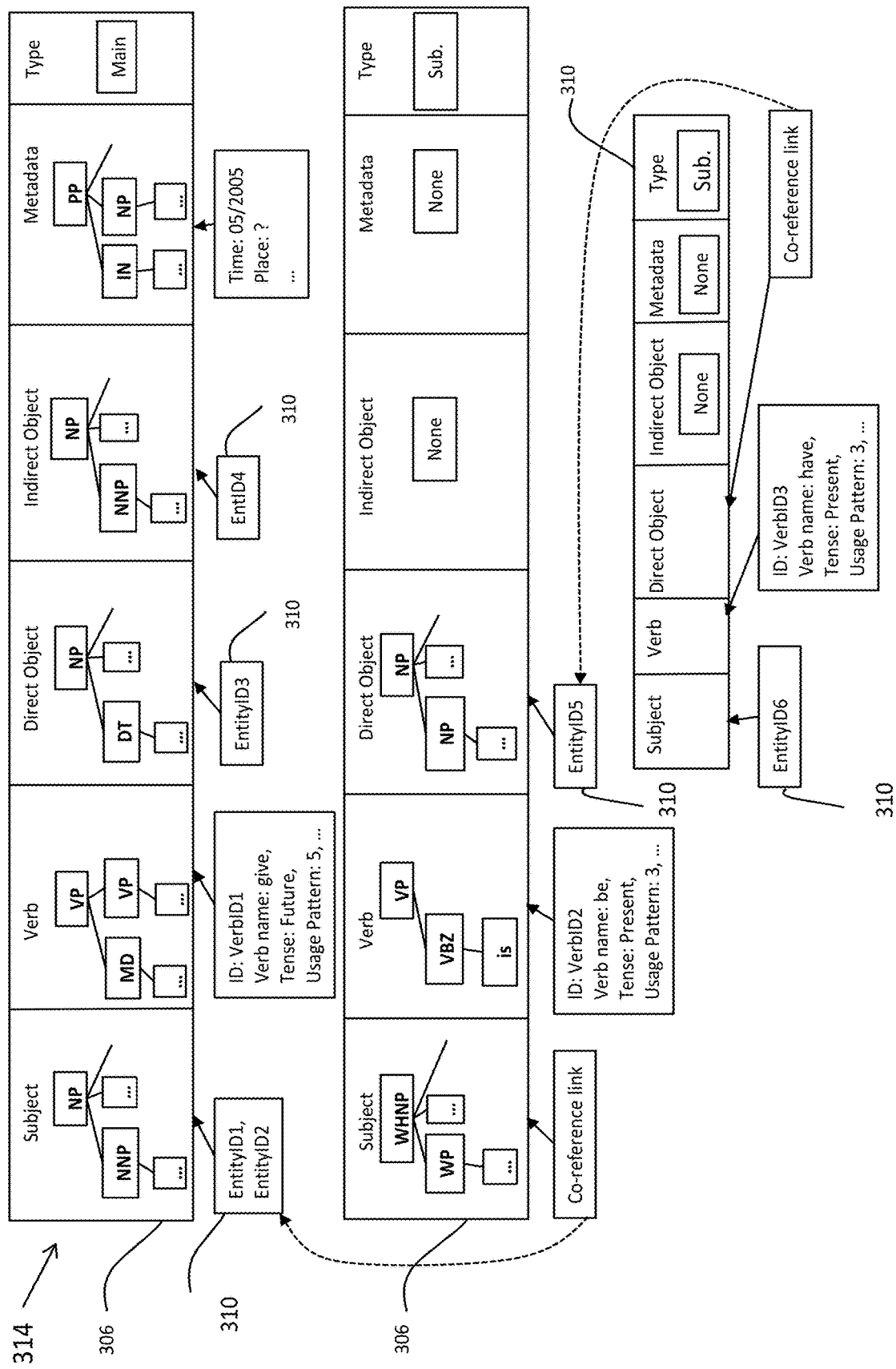
FIG. 18 shows an entity-level syntactic structure of a sentence, according to an exemplary embodiment of the subject disclosure.

FIG. 18 shows an entity-level syntactic structure of a sentence, according to an exemplary embodiment of the subject disclosure. FIG. 18 is intended to be viewed with Table 2.

TABLE 2

| George Bush | EntID1 | George W. Bush |
| George Bush | EntID2 | George H. W. Bush |
| speech | EntID3 | speech |
| Parliament | EntID4 | Parliament |
| President | EntID5 | President |
| The United States | EntID6 | The United States |
| give | VerbID1 | give |
| is | VerbID2 | be |
| have | VerbID3 | have |

At the end of the phrase analysis operation, an entity-level syntactic structure 314 is created, as depicted in FIG. 18. The generated entity-level syntactic structure 314 has 3 phrase-level records 306. Each part P of a phrase-level record 306 is associated with an entity-level record 310, a verb record 312, or a supplement record 318.

Figure 19:
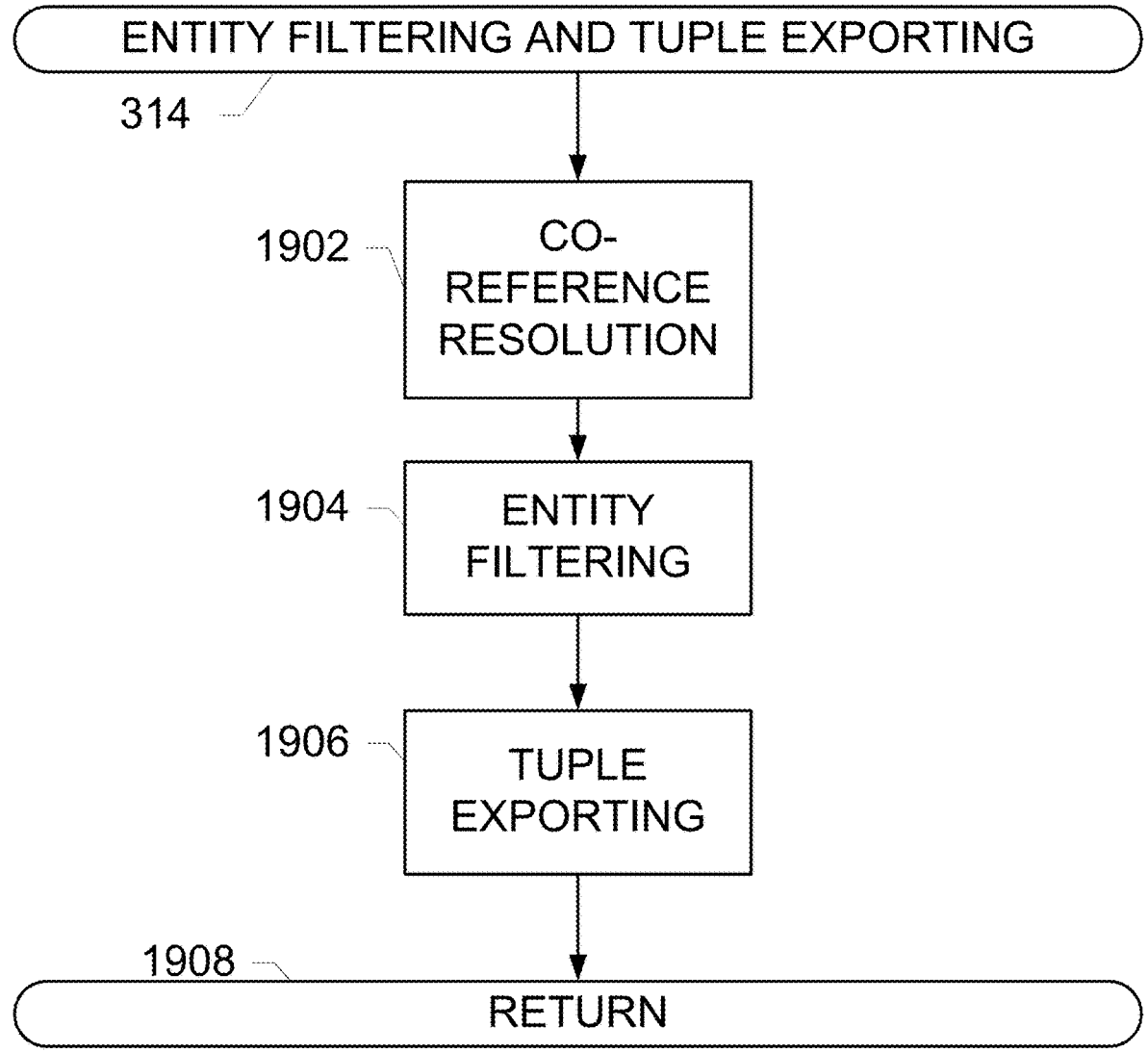
FIG. 19 shows a method for entity filtering and tuple exporting, according to an exemplary embodiment of the subject disclosure.

FIG. 19 shows the final steps of the disclosed operations, i.e. a method for entity filtering and tuple exporting 314, according to an exemplary embodiment of the subject disclosure. Although three discrete method steps are shown, the operations described herein may be paired or grouped differently depending upon the source sentence/query, or may be performed in a different order, so long as the inventive scope and spirit is preserved that enables the NLPE to analyze an input phrase and to produce the semantic structure of the phrase. As shown, method 314 includes three operations: co-reference resolution 1902, entity filtering 1904 and tuple exporting 1906. Co-reference resolution operation 1902 executes the co-reference for pronouns. In English, a pronoun, such as "he", "they", "it", etc., is used to reference one or several entities that are mentioned before the pronoun. The NLPE maintains a list of entities (represented by list of entity records in entity-level records 310) that are created before parsing this pronoun. The co-reference resolution operation 1902 selects from this list to find the most appropriate entity as the referenced entity for the pronoun. The selection of referenced entity uses the following criteria:

The type agreement between the referenced entity and the pronoun. For example, pronoun "he" is often used to reference to a human and pronoun "it" is only used to reference to a non-human object.

The cardinal agreement between the referenced entity and the pronoun. For example, "they" is used to refer to a plural entity.

The named entity is preferred to the common entity.

The semantic agreement between the referenced entity and the pronoun. For example, a company or an organization is often referenced by "it", not by a human pronoun.

The entity in the same clause is preferred.

Subsequently or in addition, the method entity filtering operation 1904 uses two semantic ways to reduce the list of EntityID in each Entity Record 310. Firstly, the method uses the modifiers extracted in Parse Noun Phrase 1200 to remove unsuitable EntityID. For example, in the noun phrase "President George Bush" of the exemplary sentence, the entity name "George Bush" can point to 6 persons and 7 things in Wikipedia (see link http://en.wikipedia.org/wiki/George_Bush_(disambiguation)). The modifier "President" may be used to reduce the list of EntityID from 13 to 2.

Subsequently or in addition, the entity filtering operation 1904 uses the semantic relation "subject-verb-object" in each clause to reduce the list of EntityID in each entity record 310. The method considers each phrase-level record in the entity-level syntactic structure. For each phrase-level records, the method seeks for all combinations (one EntityID for the subject, RelationID for the verb, another EntityID for the object) that exist in table relation 220 (see FIG. 2). Any EntityID that does not take part in any existing combination will be removed from the list of EntityID. Using this kind of filtering and the information in the subordinate clause, the entity name "George Bush" in the exemplary sentence is used to point to one entity "George W. Bush" (with EntityID1 in FIG. 20).

Subsequently, or in addition, method tuple exporting operation 1906 studies the phrase-level syntactic structure and the entity-level syntactic structures to create the sentence-level semantic structure 314 of the sentence. The sentence-level semantic structure 314 comprises a set of tuples (T1, T2, T3, T4, T5, T6), in which, T1, T3 and T4 are entities in the external KB; T2 is a relation in the KB; T5 is the metadata of T2; T6 is the type of the tuple. T6 may only contain values of "main" or "support". The sentence-level semantic structure 320 may be returned as the output of the NLP Engine in any combination of a graphical and textual format.

Moreover, for each phrase-level record, the NLPE may create one or several tuples of (T1, T2, T3, T4, T5, T6) in which T1, T3 and T4 are entities (represented by EntityID) in the knowledge base (KB), with T2 being a relation in the KB (represented by RelID), T5 being the supplement information of the tuple, and T6 being the role of the clause in the sentence (taking a value of "Main" or "Subordinate").

In one exemplary embodiment, all tuples that can be generated from a phrase-level record are outputted. From the tuple (P1, P2, P3, P4, P5, P6) of a phrase-level record, a tuple exporting operation 1906 may be executed to create a tuple of (T1, T2, T3, T4, T5, T6) for each combination of entities from the set of candidate entities/relations (Entity-Level Record 316) related to P1, P2, P3, and P4. For example, supposing that {X11, X12}, {X21}, {X31, X32, X33} and { } are the candidate set of P1, P2, P3 and P4 in a subordinate clause, respectively, 6 tuples (X11, X21, X31, None, None, Subordinate), (X11, X21, X32, None, None, Subordinate), (X11, X21, X33, None, None, Subordinate), (X12, X21, X31, None, None, Subordinate), (X12, X21, X32, None, None, Subordinate) and (X12, X21, X33, None, None, Subordinate) are created. All created tuples are returned as an output of the processing modules of the NLPE. In another embodiment, only one tuple that has the highest statistical measurement is outputted. Other combinations of outputs are possible, such as a ranking of tuples based on statistical measurements, or a prompt requesting a user to input additional search terms or queries.

Table 3 shows an exemplary output of a NLPE for an input sentence, according to an exemplary embodiment of the subject disclosure. Table 3 may be viewed in the context of the input sentence of Table 2.

TABLE 3

| EntityID1 | VerbID1 | EntityID3 | EntityID4 | ("May 2005", ...) | Main |
|---|---|---|---|---|---|
| EntityID1 | VerbID2 | EntityID5 | None | None | Subordinate |
| EntityID6 | VerbID3 | EntityID5 | None | None | Subordinate |

As is seen in Table 3, three tuples are created as the final result. The output set of tuples can be used in Search Engines, Information Retrieval or Web Semantic systems.

As described herein, the disclosed operations may be used to receive a query and provide relevant results. The query may be parsed similar to a sentence. A small modification in the clause analysis 408 may be added to determine whether or not the query comprises an explicit question, an implicit question, or a command. An explicit question is a natural-language question, e.g., "Who signs Agreement ZZZ in 2012?" An implicit question is often a shortened form of a natural-language question. For examples, query "Bill Clinton" can be the shorten form of queries "Who is Bill Clinton?" or "What is the information of Bill Clinton?" A command, e.g. "convert 1 mile to km", can be considered as "What is the converter that convert 1 mile to km?" To enable this determination, additional sentence templates (in addition to those depicted in FIG. 7) may be predefined to recognize these query types and transfer the original query to a more appropriate form that can be processed by the NLPE. With an explicit question, the query may not be altered prior to being parsed. With an implicit question, the original "Noun-Phrase" may be recognized and transferred to a query generation operations, for instance by adding "Who is Noun-Phrase?" With a command, the original query "Action something" may be converted to "What is Actor that Action something?". Other phases remain the same, i.e. clause analysis, etc.

Similar to the above modifications, additional modifications may be made to process an input paragraph. In a paragraph, the first sentence often describes the main topic of the paragraph, in form of main entities. The remaining sentences of the paragraph develop the main topic by mention about the main entities. They may explicitly mention the exact name or the shorten name of main entities. They may also implicitly mention the main entities by synonyms, equivalent terms or pronoun. Therefore, in parsing a sentence of a paragraph, maintaining the stated list of entities in previous sentence and executing co-reference resolution may be essential tasks. For instance, the first sentence of a paragraph may be used to create a list of stated entities. The remaining sentences may consequently be parsed with reference to the existing list of stated entities. After parsing each sentence, the list of entities may further be updated with the recognized entities from the sentence. In another exemplary embodiment, the first two sentences of the paragraph may be parsed prior to creating the list of stated entities.

Further, an electronic document such as an article or web page may be used as an input. For instance, a web page may have a structure comprising of a header, a body, and an ending. The header may further comprise one or more of a leading sentence or phrase, a title, a date and time of publication, and/or an author or source. The body part may comprise one or more of a section or several section, and several paragraphs within each section. Finally, an ending may comprise an author and/or citations. These sections are merely used for exemplary purposes, and other sections may be present, or these sections may be absent from many other types of documents. In either case, the inventive operations disclosed herein are able to parse such a document.

Figure 20A:
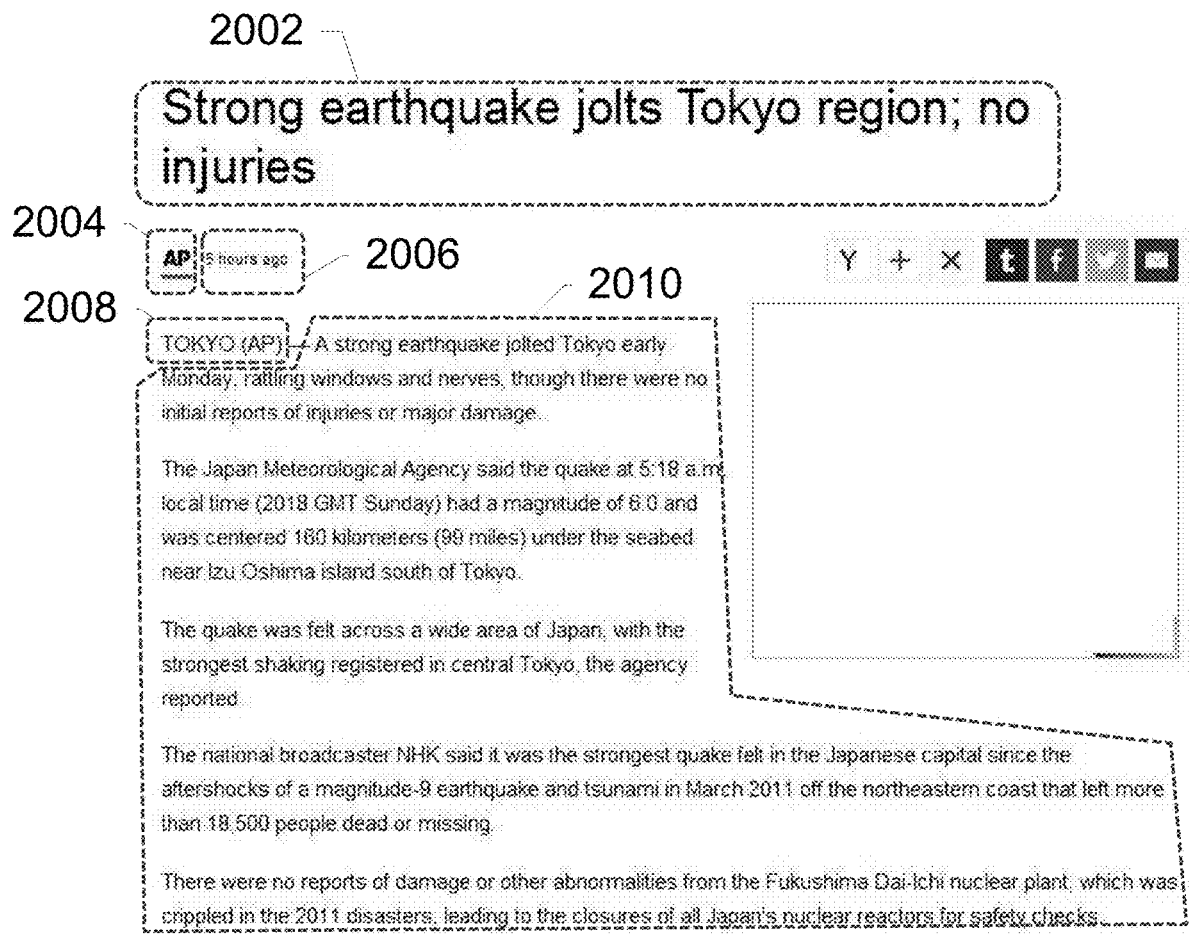
FIGS. 20A and 20B respectively show a structure of a document and a method for parsing the document, according to an exemplary embodiment of the subject disclosure.
Figure 20B:
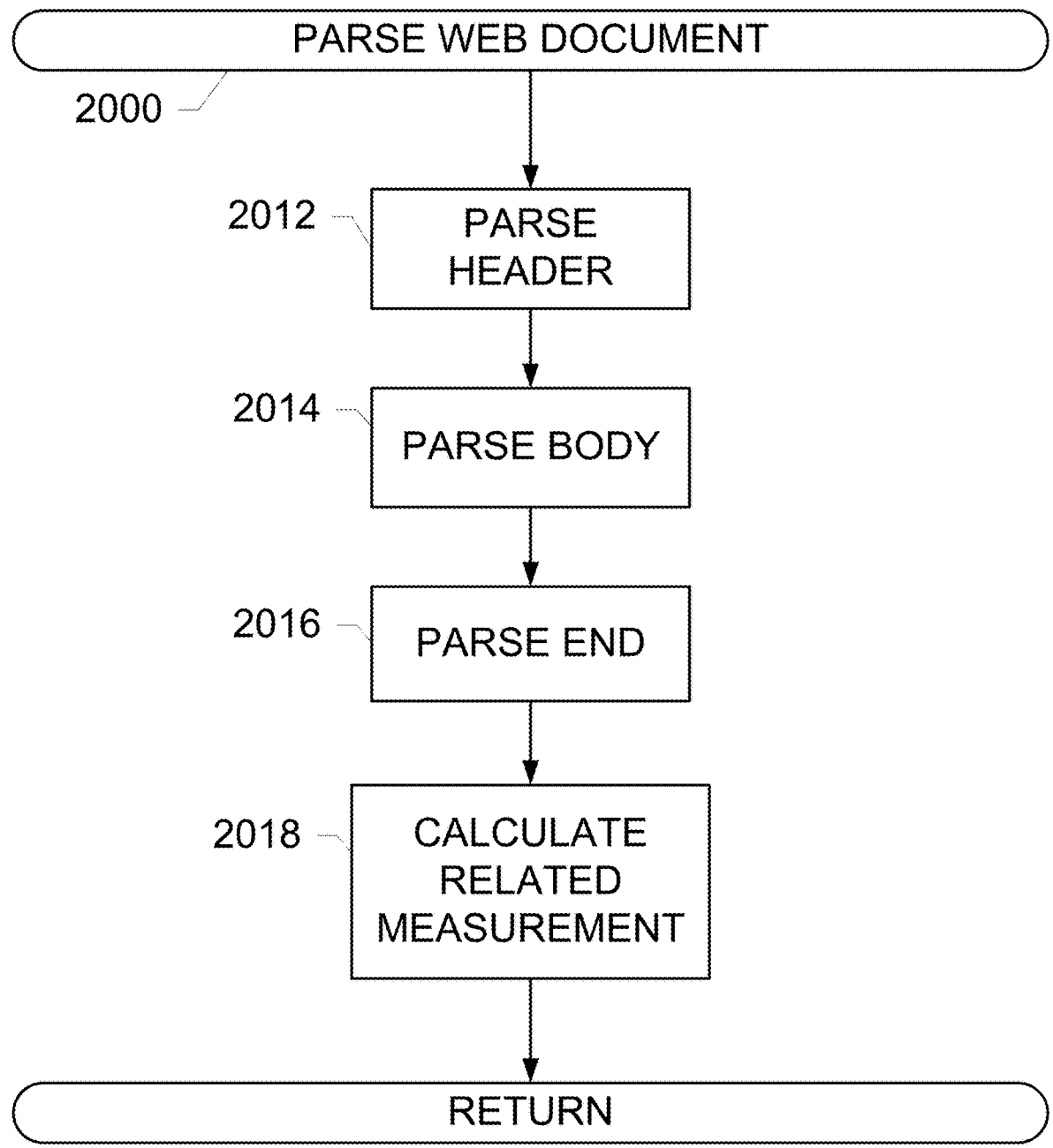

FIGS. 20A-20B show parsing of a document, according to an exemplary embodiment of the subject disclosure. FIG. 20A shows a structure of an exemplary document. Section 2002 is the title. Section 2004 is the source of the page. Section 2006 is the time of publishing. Section 2008 is the source of page in the body. Section 2010 is the body. The header part may comprise sections 2002, 2004, 2006 and 2008. The body part may comprise section 2010. No ending part is shown. With reference to FIG. 20B, a method 2000 for parsing the exemplary document is shown. The first operation is a parse header operation 2012, which comprises parsing portions of the header part by executing a parse sentence operation 400 on each portion of the header. Since each portion of the header part is often a short phrase with a particular format, additional sentence templates 700 may be predefined to enable the parse sentence operation to function. In some embodiments, the additional templates may be automatically detected and added as the NLPE continues to parse more different types of documents, with results being double-checked for errors. Subsequently or simultaneously, the body part is parsed 2014, enabled by executing the parse paragraph operations described above on each paragraph of the document. Subsequently or simultaneously, an ending may be parsed 2016, using similar methods as the header parsing 2012. Finally, a calculate related measurement operation 2018 may be executed to calculate the related measurement between each mentioned entity and the document. This related measurement may represent the relationship between a mentioned entity and a document. It associates with where the entity is mentioned in the document, how importance the mentioned entity is, how much information the document described about the mentioned entity and other factors. The related measurement function may be included within the NLPE, or may be provided by an external system.

Therefore, the disclosed methods can process sentences and phrases and provide meaningful analyses and results that take into account the clause structure of a sentence (stored in the phrase-level syntactic structure), while filtering and matching entities with the context of the input sentence or document, as well as with reference to relevant entities from the knowledge base. These improvements overcome existing methods that use brute-force methods to evaluate phrases and components of clauses without considering an overall context, or those that may even apply grammatical rules but fail to consider the clause structure of a sentence, or multiple nested clauses within a sentence, and fail to properly determine which entities are relevant, and do not filter entities.

While the above description contains much specificity, these should not be construed as limitations on the scope of any embodiment, but as exemplifications of the presently preferred embodiments thereof. Many other ramifications and variations are possible within the teachings of the various embodiments. For example, although four stated tenses are processed (see FIG. 6), other tenses can be implemented by the same method. Moreover, although the templates have been described with reference to the English language, persons having ordinary skill in the art may be motivated in light of this disclosure to adapt the templates to various other dialects and languages without departing from the inventive scope and spirit of the disclosed operations. Thus the scope of the subject disclosure should be determined by the appended claims and their legal equivalents, and not by the examples given.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A system for parsing a natural-language sentence, the system comprising:
 a server; and
 a memory coupled to the server, the memory to store logical instructions that are executed by the processor to perform operations comprising:
  creating a phrase-level syntactic structure based on a syntactic structure of an input query comprising one or more phrases; wherein the creation of the phrase-level syntactic structure further comprises recognizing one or more clauses in the input query and parsing one or more verb phrases in each clause; wherein recognizing the one or more clauses comprises matching the syntactic structure of the input query with one or more sentence templates to determine one or more main clauses and one or more clause-support subordinate clauses;

constructing an entity-level syntactic structure based on the phrase-level syntactic structure;

constructing a sentence-level semantic structure based on the entity-level syntactic structure; and returning a set of tuples in the sentence-level semantic structure as an output.

2. The system of claim 1, wherein the parsing of the one or more verb phrases comprises parsing a verb tense and a verb part.

3. The system of claim 2, wherein the parsing of the verb tense further comprises matching a syntactic structure of the one or more verb phrases with one or more verb tense templates to determine a tense or a voice of a main verb.

4. The system of claim 2, wherein the parsing of the one or more verb parts in each clause comprises finding all verb types and corresponding verb usage templates for a stemmed main verb;

matching one or more of the corresponding verb usage templates with each verb part;

extracting a plurality of parts from the syntactic structure of the one or more verb phrases based on the matched verb usage templates;

creating a phrase-level record from the extracted plurality of parts; and creating a corresponding verb record for the stemmed main verb.

5. The system of claim 1, wherein constructing the entity-level syntactic structure further comprises:

parsing a first noun phrase for each phrase-level record;

parsing a second noun phrase in a direct object part of said each phrase-level record;

parsing a third noun phrase in an indirect object part of said each phrase-level record; and parsing a supplement part of said each phrase-level record.

6. The system of claim 5, wherein the parsing of each noun phrase further comprises:

searching an entire surface form of the noun;

upon finding the entire surface form, parsing the noun phrase as a single noun phrase;

upon determining that the noun is a pronoun, tagging the pronoun for a subsequent co-reference resolution; and upon determining that the noun phrase is not a single noun phrase, parsing the noun phrase as a complex noun phrase.

7. The system of claim 6, wherein the parsing of the noun phrase as a single noun phrase comprises:

searching within the noun phrase for a longest head noun that matches an entity name found in a knowledge base;

extracting one or more modifiers of the longest head noun;

parsing any existing adjective phrase in the noun phrase to extract additional modifiers; and outputting an entity-level record for the noun phrase, the entity-level record including the longest head noun and the one or more modifiers and any additional modifiers.

8. The system of claim 6, wherein the parsing of the noun phrase as a complex noun phrase comprises:

matching one or more complex noun phrase templates to a syntactic structure of the noun phrase;

upon a determination that the complex noun phrase comprises a plurality of simple noun phrases, parsing each simple noun phrase and combining results;

parsing any existing prepositional phrases;

parsing any existing subordinate clauses; and creating an entity-level record for each noun phrase as a returned result.

9. The system of claim 6, wherein parsing the complex noun phrase further comprises:

parsing a main noun phrase within the complex noun phrase to retrieve an entity-level record for the main noun phrase;

parsing a prepositional phrase within the complex noun phrase to retrieve a preposition and an entity-level record of the prepositional phrase;

creating a phrase-level record to the entity-level syntactic structure, the phrase-level record representing a relation between the entity-level record of the main noun phrase with the entity-level record of the prepositional phrase; and returning the entity-level record of the main noun phrase as its results.

10. The system of claim 1, wherein the operations further comprise parsing a subordinate clause by:

matching one or more subordinate clause templates with a syntactic structure of a subordinate clause;

extracting a Wh-part and an internal clause;

parsing the Wh-part;

parsing one or more noun phrases and verb parts of the internal clause; and creating a Phrase-Level Record for the subordinate clause.

11. The system of claim 1, wherein the operations further comprise parsing an adjective phrase by:

parsing an adjective in the adjective phrase;

parsing an adverb in the adjective phrase; and outputting the parsed adjective and parsed adverb.

12. The system of claim 1, wherein the construction of the sentence-level sematic structure comprises:

executing a co-reference resolution on one or more pronouns based on the entity-level semantic structure;

filtering one or more entities by using one or more of a semantic relation in the entity-level semantic structure or a modifier of a noun phrase; and constructing a list of tuples from the one or more entity-level records.

13. The system of claim 12, wherein the co-reference resolution further comprises:

searching on a list of previously-parsed entities; and selecting a most appropriate entity as a reference entity for the pronoun based on one or more semantic guidelines.

14. A non-transitory computer-readable medium for storing computer-executable instructions that are executed by a processor to perform operations comprising:

parsing a first sentence received in a query to create a list of stated entities, wherein the query comprises a paragraph; and parsing each remaining sentence in the paragraph with the list of stated entities and updating the list with one or more recognized entities in said each remaining sentence; and creating a phrase-level syntactic structure based on a syntactic structure of the first sentence comprising one or more phrases; wherein the creation of the phrase-level syntactic structure further comprises recognizing one or more clauses in the first sentence and parsing one or more verb phrases in each clause; wherein recognizing the one or more clauses comprises matching the syntactic structure of the first sentence with one or more sentence templates to determine one or more main clauses and one or more clause-support subordinate clauses.

15. The computer-readable medium of claim 14, wherein the operations further comprise:
constructing a sentence-level semantic structure based on the phrase-level syntactic structure to enable the creating of the list of stated entities.

16. A non-transitory computer-readable medium for storing computer-executable instructions that are executed by a processor to perform operations comprising:
parsing a header part of an input document to retrieve a sentence-level semantic structure for the header part;
parsing a body part of the input document based on a plurality of entities retrieved from the sentence-level semantic structure for the header part;
calculating a related measurement between each of the plurality of entities in the input document; and
creating a phrase-level syntactic structure based on a syntactic structure of the header comprising one or more phrases; wherein the creation of the phrase-level syntactic structure further comprises recognizing one or more clauses in the header and parsing one or more verb phrases in each clause; wherein recognizing the one or more clauses comprises matching the syntactic structure of the header with one or more sentence templates to determine one or more main clauses and one or more clause-support subordinate clauses.

17. The computer-readable medium of claim 16, wherein the operations further comprise matching the header part with one or more predefined sentence templates.

18. The computer-readable medium of claim 16, wherein the operations further comprise automatically detecting and adding a new sentence template to the one or more predefined sentence templates.

* * * * *